United States Patent
Crouch

(10) Patent No.: US 12,156,585 B2
(45) Date of Patent: Dec. 3, 2024

(54) HYDRATION DELIVERY TUBE WITH CHECK VALVE

(71) Applicant: Jeffrey C. Crouch, St. George, UT (US)

(72) Inventor: Jeffrey C. Crouch, St. George, UT (US)

(73) Assignee: Vakyoom, LLC, St. George, UT (US)

( * ) Notice: Subject to any disclaimer, the term of this patent is extended or adjusted under 35 U.S.C. 154(b) by 371 days.

(21) Appl. No.: 17/543,457

(22) Filed: Dec. 6, 2021

(65) Prior Publication Data

US 2022/0087403 A1  Mar. 24, 2022

Related U.S. Application Data

(63) Continuation-in-part of application No. 16/995,608, filed on Aug. 17, 2020, now abandoned.

(60) Provisional application No. 62/887,883, filed on Aug. 16, 2019.

(51) Int. Cl.
| | |
|---|---|
| *A47G 21/18* | (2006.01) |
| *A45F 3/16* | (2006.01) |
| *A47G 19/30* | (2006.01) |
| *F16K 15/04* | (2006.01) |

(52) U.S. Cl.
CPC ............ *A45F 3/16* (2013.01); *A47G 21/18* (2013.01); *A45F 2003/166* (2013.01); *A47G 21/184* (2013.01); *A47G 21/185* (2013.01); *F16K 15/04* (2013.01)

(58) Field of Classification Search
CPC .............. A45F 3/20; A45F 2003/166; A47G 2400/027; A47G 21/188; A47G 21/185; A47G 21/186; A47G 21/18
USPC ........................................................ 239/33
See application file for complete search history.

(56) References Cited

U.S. PATENT DOCUMENTS

| | | | | |
|---|---|---|---|---|
| 5,119,978 A | * | 6/1992 | Kalamaras | A45F 3/16 222/401 |
| 5,158,218 A | * | 10/1992 | Wery | B67D 1/0456 222/394 |
| 5,201,442 A | * | 4/1993 | Bakalian | A45F 3/16 222/626 |
| 5,213,309 A | * | 5/1993 | Makishima | G01N 1/2035 251/149.6 |
| 5,215,231 A | * | 6/1993 | Paczonay | F04B 9/14 224/427 |
| 5,326,124 A | * | 7/1994 | Allemang | B62J 11/04 280/288.4 |
| 5,358,142 A | * | 10/1994 | Holmes | B62J 9/22 222/105 |
| 5,607,087 A | * | 3/1997 | Wery | B67D 1/0456 222/401 |

* cited by examiner

*Primary Examiner* — Chee-Chong Lee
(74) *Attorney, Agent, or Firm* — Gurr Brande & Spendlove, PLLC; Robert A. Gurr

(57) ABSTRACT

A hydration system includes a liquid reservoir, a bottleneck plug, a tube, a hydration valve (e.g., bite valve), and a flow-restricting device (e.g., check valve). The tube comprises a first end for coupling to the liquid reservoir via the plug, a second end having the hydration valve, and the flow-restricting device interposed between the liquid reservoir and the hydration valve. The plug may be inserted into a variety of bottlenecks.

3 Claims, 25 Drawing Sheets

HYDRATION DELIVERY TUBE WITH CHECK VALVE

CROSS-REFERENCE TO RELATED APPLICATIONS

This application is a continuation-in-part of U.S. Non-Provisional application Ser. No. 16/995,608 filed Aug. 17, 2020, which claimed benefit to U.S. Provisional Application Ser. No. 62/887,883, filed on Aug. 16, 2019, both of which are incorporated herein by reference.

TECHNICAL FIELD

The present disclosure relates to a hydration device. More particularly, the present disclosure relates to a hydration tube with an integrated pressure check-valve, the hydration tube can be coupled to a standard disposable water bottle or any water hydration bladder.

BACKGROUND

Water hydration systems have evolved over many years. For example, there have been many devices to obtain, carry, and consume water, such as ladles to scoop water, canteens, and now tube style hydration systems with a connected bladder. Bladder hydration systems changed the way that backpackers, mountain bikers, campers, and many other people, carry water on their journeys. Carrying water with a bladder hydration system is easy. Being able to place the hydration bladder within a backpack helps the user more easily pack heavy loads of water for whatever they are doing. In addition, water is more accessible when using a bladder hydration system. With water being more accessible, the likelihood that a user remains hydrated is higher, which is quite different from the user that has to take off a backpack and dig through it for a water bottle.

As incredible as the bladder hydration system has been, there are still some glaring issues. For example, the bladder is susceptible to unsanitary conditions if not constantly and properly maintained. The bladder creates an environment where bacteria can thrive, which can make cleaning the hydration bladder extremely difficult. If it is not cleaned after a use, then the next time it is used there may be a fowl taste, or it could potentially cause sickness. Further, mold can accumulate in the hydration bladder due to the fact that the warm, moist environment creates the perfect growing medium. Bacteria found in the hydration bladder often comes from the backflow (saliva) of the user because there is nothing to prevent backflow. With the backflow flowing from the mouthpiece through the tube and back into the bladder, it is inevitable that bacteria from the mouth will enter the hydration bladder. Not only does saliva enter the hydration bladder, but dirt and other outside contaminants may also enter. Keeping the hydration bladder clean can be frustrating, especially when numerous chemicals and brushes have to be employed in the cleaning process.

Further, once the hydration bladder is empty, it is not convenient to refill without a faucet. Accordingly, once emptied, a user may often still rely on water bottles to hydrate until they are able to conveniently and easily refill the bladder.

The above problems assume that each user has a hydration bladder. However, many users do not have a hydration bladder, and buying such a system may be cost prohibitive in addition to the faults outlined above.

Accordingly, there is a need for a hydration system that is low maintenance, stays clean, does not require the use of a hydration bladder, and prevents backflow. The present disclosure seeks to solve these and other problems.

SUMMARY OF EXAMPLE EMBODIMENTS

In some embodiments, a hydration system comprises a liquid reservoir, a reservoir coupler, a tube, a hydration valve (e.g., bite valve), a tube coupler, and a flow-restricting device within the tube (e.g., check valve). The tube comprises a first end having the hydration valve, a second end for coupling to the liquid reservoir, and the flow-restricting device interposed between the first and second ends. In some embodiments, the flow-restricting device may be located in the liquid reservoir, in the reservoir coupler, or anywhere in the tube.

In some embodiments, a hydration system further comprises a water filter. The water filter can be coupled anywhere in, or along, the tube.

In some embodiments, a hydration delivery system comprises a first end having a hydration valve, a second end for coupling to a liquid reservoir, and a check valve within the tube interposed between the first and second ends.

In some embodiments, a hydration system comprises a tube having a T-coupler. The T-coupler has three coupling sites: a first, a second, and a third, where three separate tubes may connect. The first coupling site couples to a primary tube, while the second coupling site couples to a secondary tube, and the third coupling site couples to a tertiary tube.

In some embodiments, a hydration system comprises a liquid reservoir, a reservoir coupler, a tube, and a flow-restricting device. The tube is continuous, without any breaks therein, such as a quick connect coupler. Additionally, a user retrieves liquid from the liquid reservoir by applying suction on the tube, without the aid of any type of a bite valve.

In some embodiments, a hydration system comprises T-couplers, liquid reservoirs, a plurality of tubes, and tube couplers (e.g., quick connects). With numerous T-couplers, a user may retrieve water from more than a single tube. It will be appreciated that multiple users may drink from the same liquid reservoirs without contaminating them. The tube couplers may allow water filters, liquid reservoirs, or any tube to be connected thereto.

DETAILED DESCRIPTION OF EXAMPLE EMBODIMENTS

Figure 1:
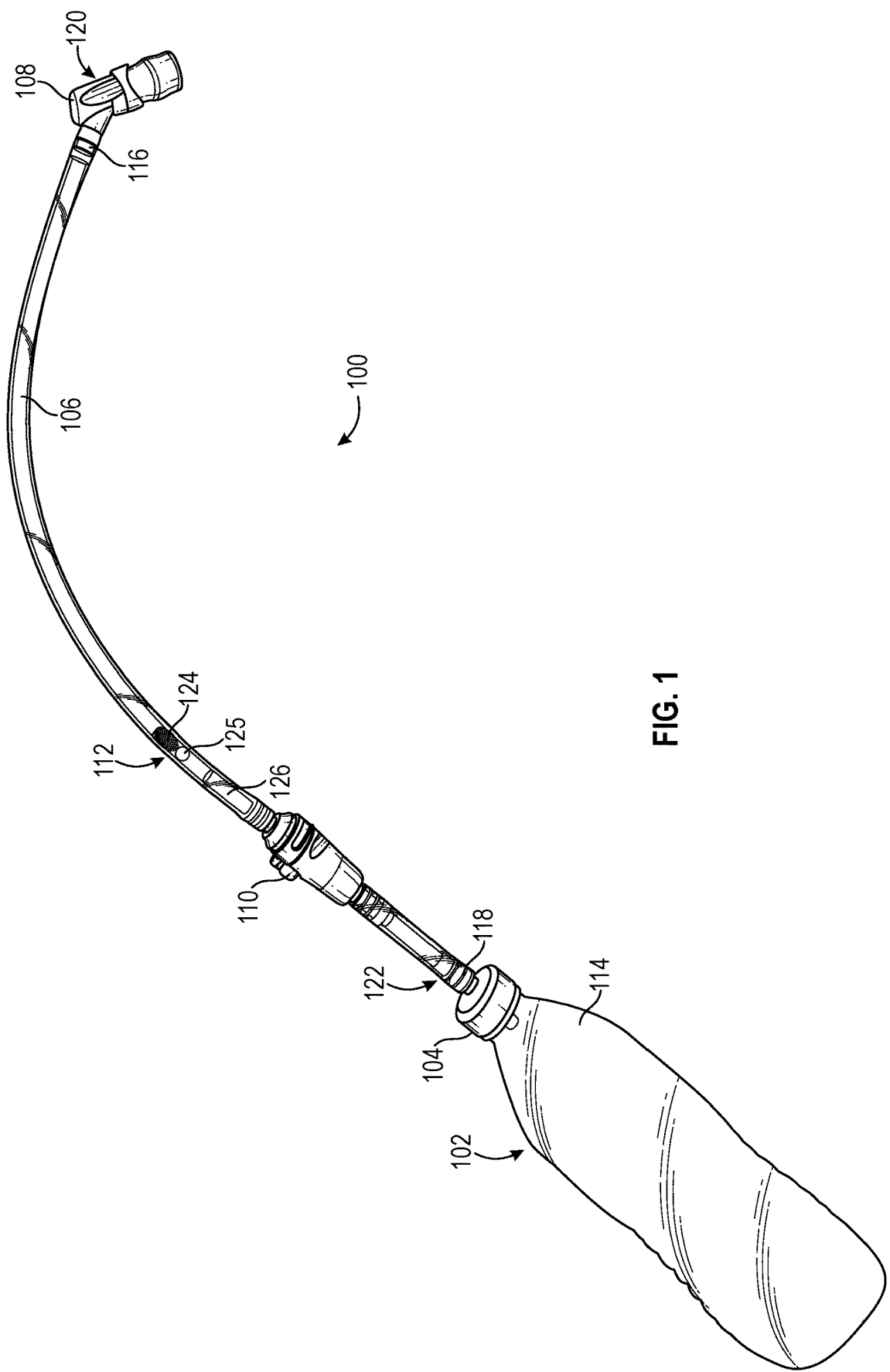
FIG. 1 illustrates a side perspective view of a hydration system.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "some embodiments," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in some embodiments," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from some embodiments to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a hydration system that is low maintenance, stays clean, does not require the use of a hydration bladder, and prevents backflow. The present disclosure seeks to solve these and other problems.

The hydration system described herein generally comprises a liquid reservoir, a tube, and a tube coupler. The hydration system may be rearranged into many, different configurations. In other words, the hydration system may utilize a check valve, a water filter, and be coupleable to multiple bottles at the same time. The ability to quickly connect and disconnect tubes, bottles, and filters via the tube couplers allows a user many options, depending on their needs. It will be appreciated that the hydration system is easy to use and a customizable system for any endeavor. Further, the hydration system is simple to clean or simply discard due to the liquid reservoir used (e.g., a disposable bottle). Once the water has been removed from the liquid reservoir, a clean reservoir then may be quickly coupled, preventing the hassle of cleaning and refilling a hydration bladder.

Figure 2:
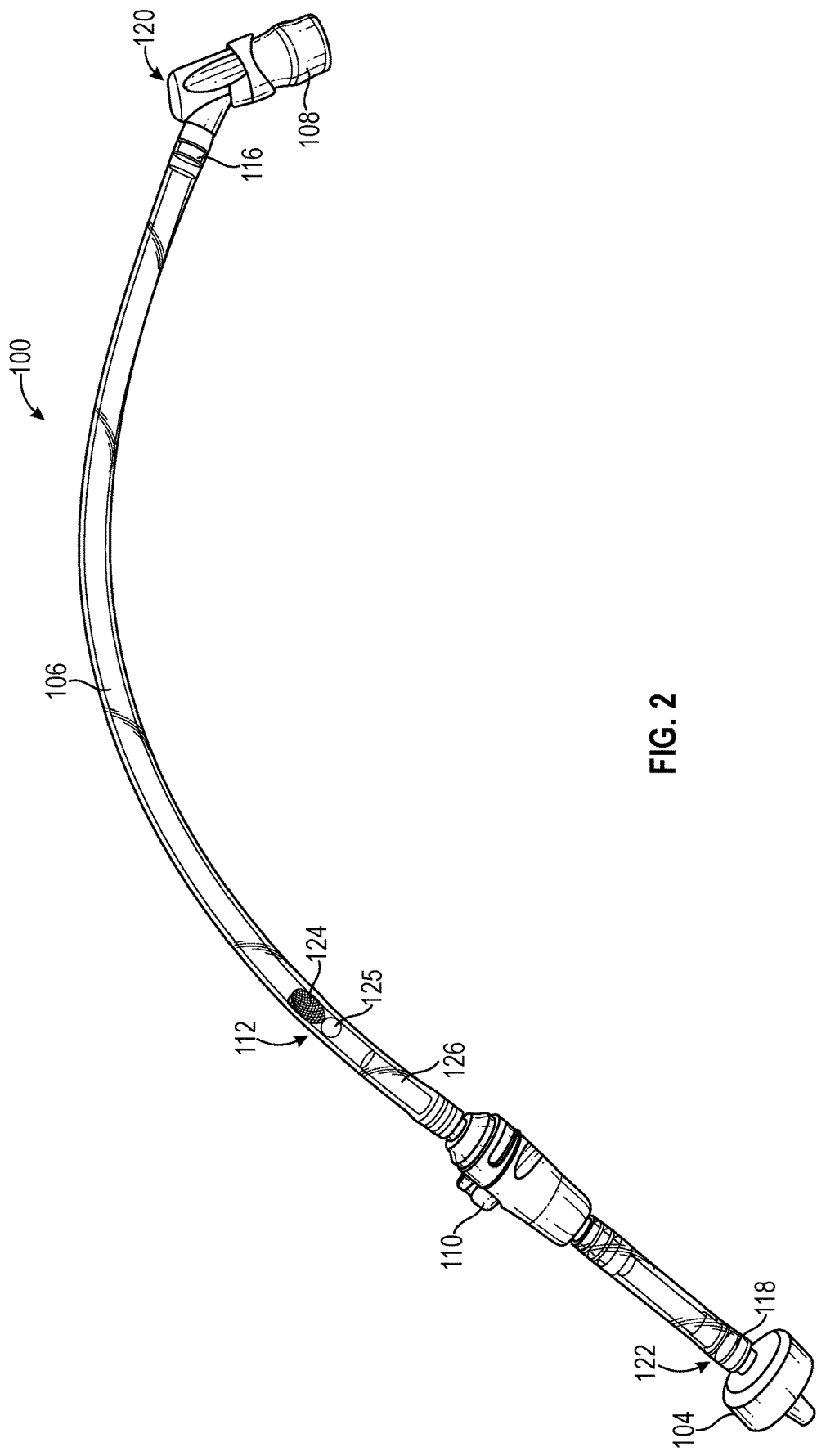
FIG. 2 illustrates a side perspective view of a hydration delivery tube.
Figure 3:
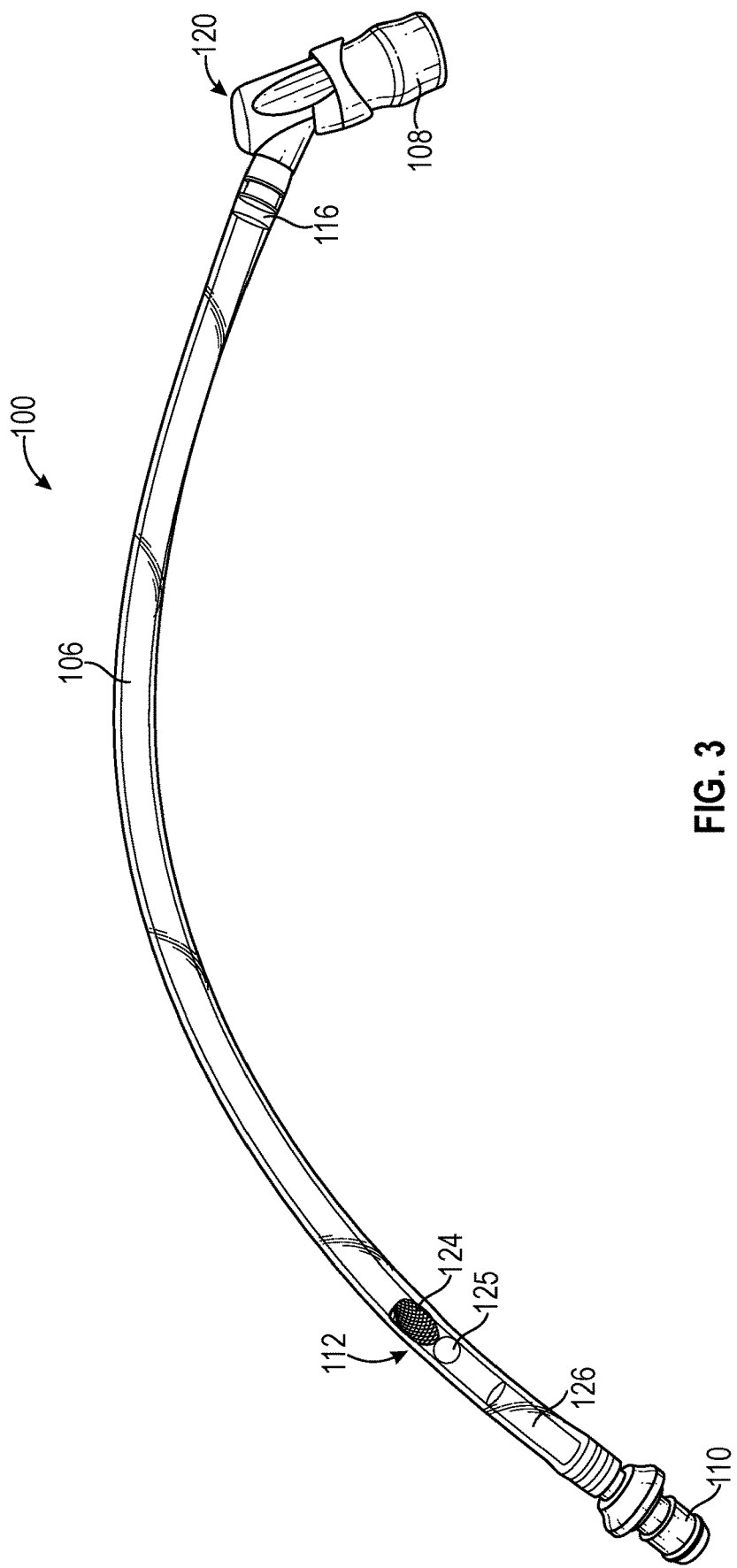
FIG. 3 illustrates a side perspective view of a hydration delivery tube.

In some embodiments, as shown in FIGS. 1-3, a hydration system 100 comprises a liquid reservoir 102, a reservoir coupler 104, a tube 106, a hydration valve 108 (e.g., bite valve), a tube coupler 110 (e.g., quick connect coupler), and a flow-restricting device 112 (e.g., check valve). The reservoir coupler 104 couples the tube 106 to the liquid reservoir 102. While a disposable bottle 114 is shown, any liquid reservoir may be used, such as a metal bottle, rubber reservoir, etc. The reservoir coupler 104 may be numerous sizes and comprise various coupling mechanisms to accommodate a variety of liquid reservoirs 102. For example, the reservoir coupler 104 can accommodate wide-mouth, narrow-mouth, or any other size of bottle aperture. The coupling mechanism of the reservoir coupler 104 may be threads, slide-on, twist lock, or any mechanism that can be removably attachable and create a seal to prevent liquid from exiting the liquid reservoir 102. In addition, the reservoir coupler 104 can be made from numerous materials, including rubber, plastic, metal, etc. In one example, the reservoir coupler 104 may be compatible with standard disposable water bottles.

Furthermore, the tube 106 is coupled to the hydration valve 108 and the reservoir coupler 104 by a first coupling 116 and a second coupling 118, respectively, which can be a male and female connection. The tube 106 may be a thin, pliable material, such as silicone, that can be easily folded and placed in a compact space. Alternatively, the tube may be made of a thick, insulated material so as to keep liquid from being heated while in the tube 106. In some embodiments, the tube 106 comprises a neoprene covering to add insulation. The tube 106 may be a sufficient length so as to reach a user's mouth and to extend to the liquid reservoir 102. However, varying lengths could be used depending on the application, such as attaching to a backpack 130 (FIG. 4), bike, or stroller. For example, in some embodiments, the hydration system can be coupled to the backpack 130, satchel, or purse. As liquid flows through the tube 106, it travels from the liquid reservoir 102 to the user's mouth via, for example, the hydration valve 108.

The hydration valve 108 allows a user to access the liquid in the liquid reservoir 102 through suction or a vacuum effect. The hydration valve 108 can be, but is not limited to, a bite valve, a slidable valve, a straw-like valve with a cap, or any other valve, made from a pliable or non-pliable material, to provide access to the liquid in the liquid reservoir 102. For example, a user would bite down on the bite valve and apply vacuum pressure (i.e., suction). The vacuum pressure opens the check valve 112, allowing water to by through it and then through the bite valve 108. Once a user releases the bite valve 108, it is not uncommon for backflow to enter the tube 106. However, due to the check valve 112, backflow is prohibited from entering the reservoir 102. Usually, a hydration valve 108 is removably attachable to the tube 106 to allow easy cleaning and replacement if necessary. However, there may be circumstances where the hydration valve 108 is permanently coupled to the tube 106 so that removal is not possible. Alternatively, in some embodiments, the hydration system may not require a hydration valve 108. For example, the user may draw liquid directly from the tube 106, relying solely on the check valve 112 to control flow out of, and into, the reservoir 102.

Although not required, the tube coupler 110 (e.g., a quick connect coupler of the art), best seen in FIG. 2, is interposed between a first end 120 having the hydration valve 108 and a second end 122 having the reservoir coupler 104, which allows the tube 106 to be easily decoupled and coupled to various reservoir couplers 104. For example, a user can use the tube coupler 110 to quickly switch between a narrow water bottle, wide-mouth water bottle, or even a hydration bladder. For example, the tube coupler 110 can be directly coupled to a water bladder, such as a CamelBak® hydration bladder, allowing a user to utilize the hydration valve 108 and check valve 112 combination therewith. The tube coupler 110 can be any coupling mechanism, such as a quick connect system, threaded coupler, latch, etc. Further, the coupler 110 allows additional accessories to be easily utilized, such as a water filter. The tube coupler 110 can be located anywhere along the tube 106, such as near the hydration valve 108 or near the reservoir coupler 104.

Figure 4:
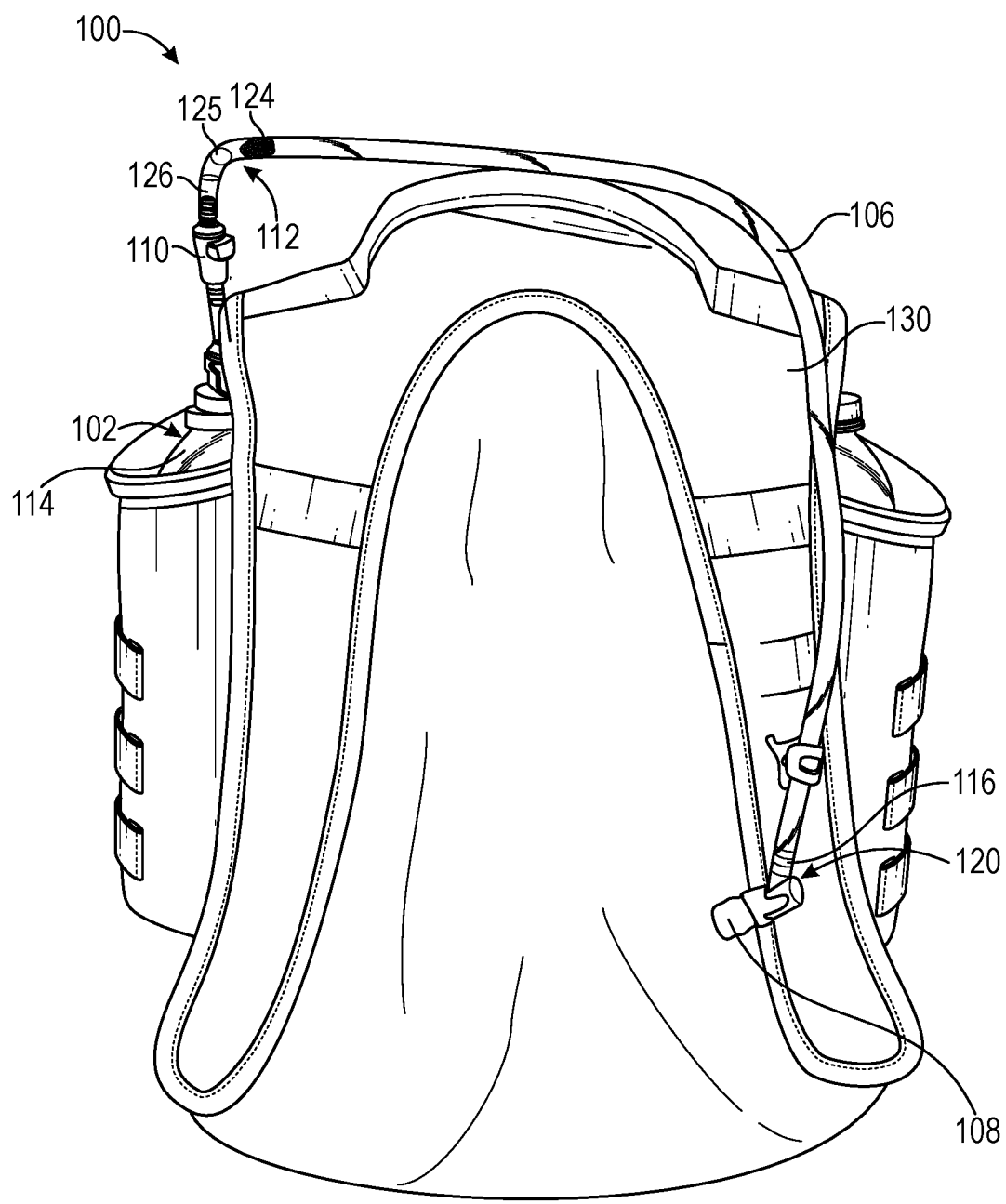
FIG. 4 illustrates a rear perspective view of a hydration system coupled to a backpack.
Figure 5:
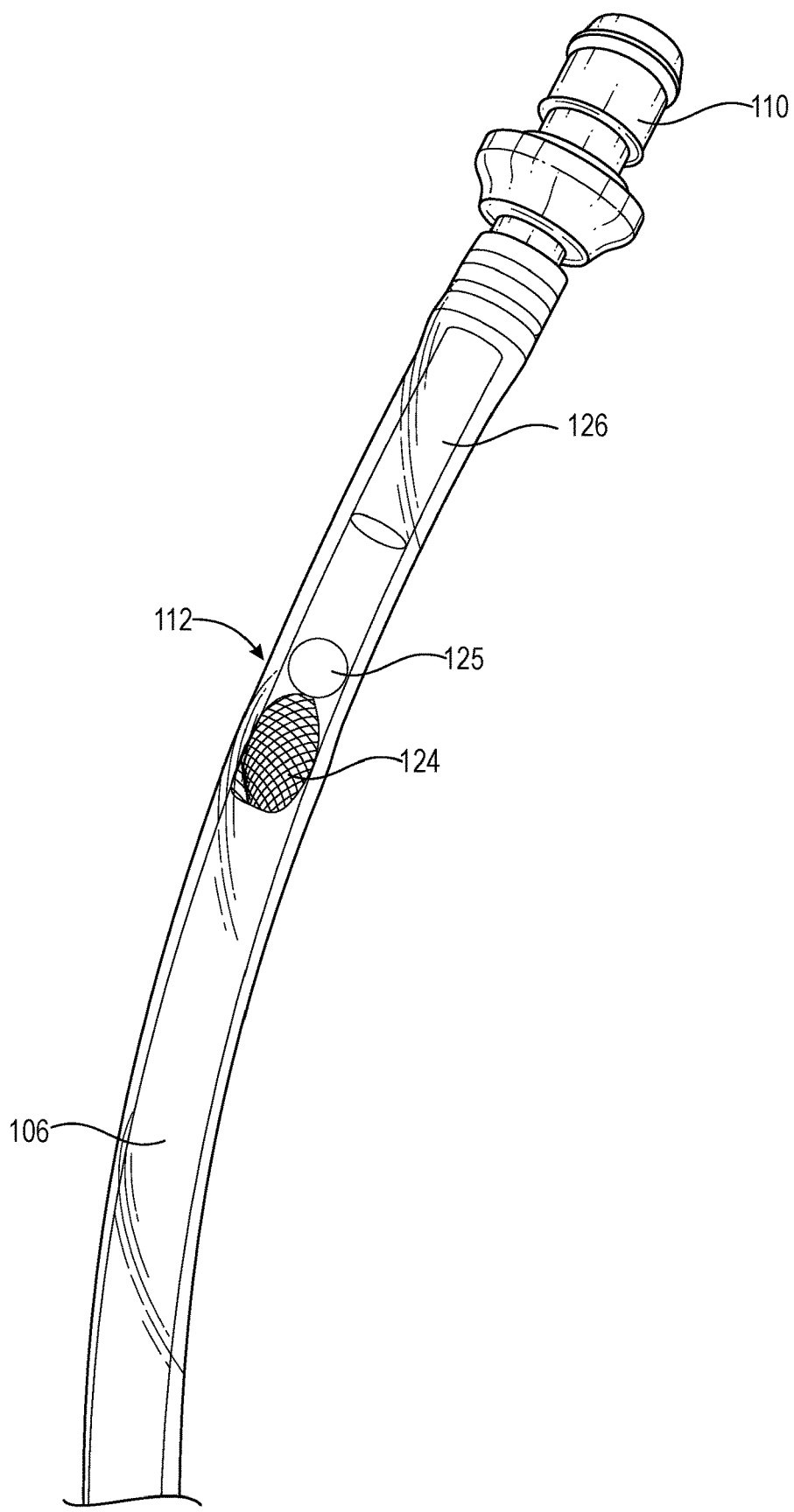
FIG. 5 illustrates a perspective, detailed view of a flow-restricting device in an open position of a hydration system.
Figure 6:
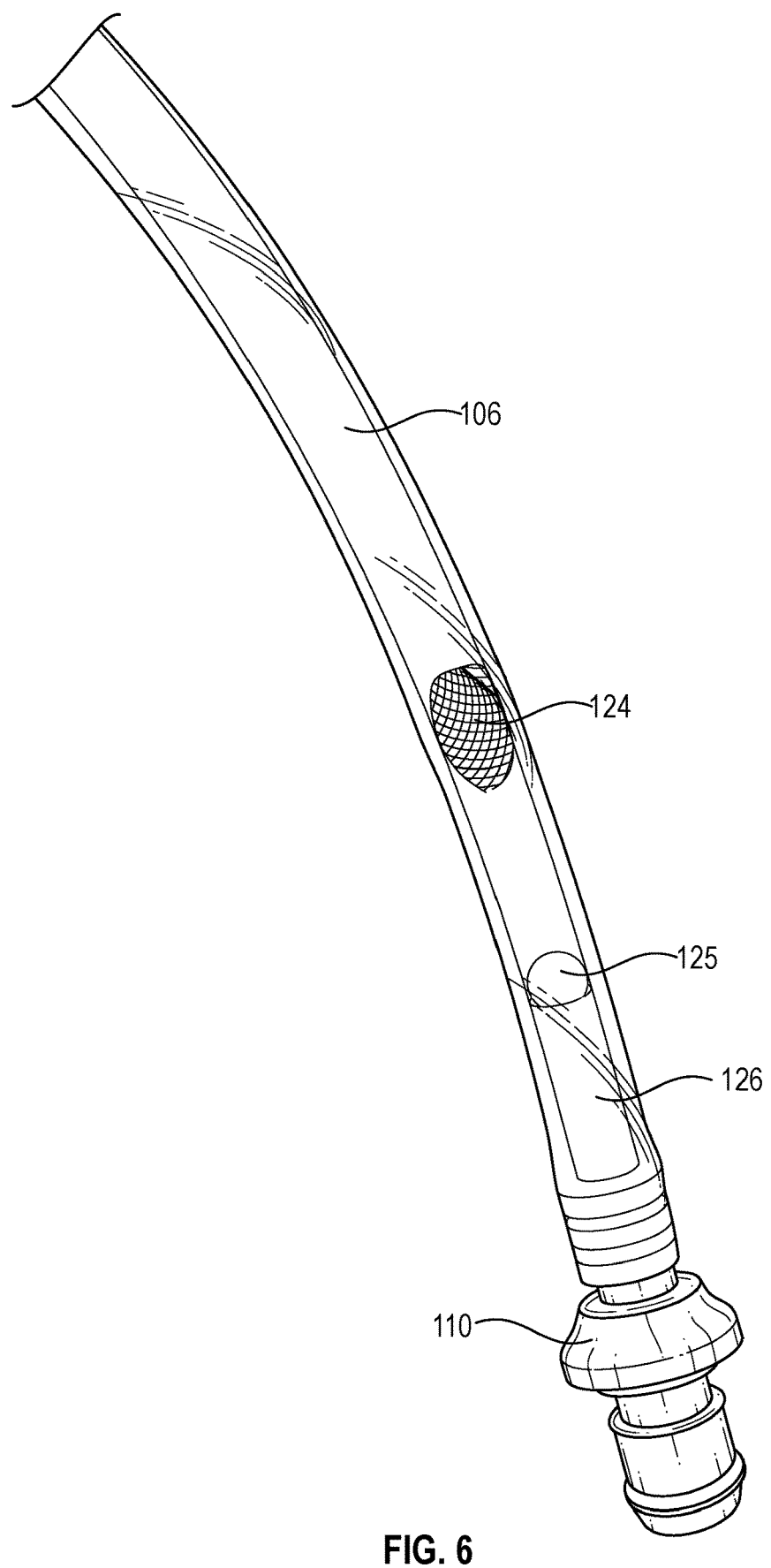
FIG. 6 illustrates a perspective, detailed view of a flow-restricting device in a closed position of a hydration system.
Figure 7:
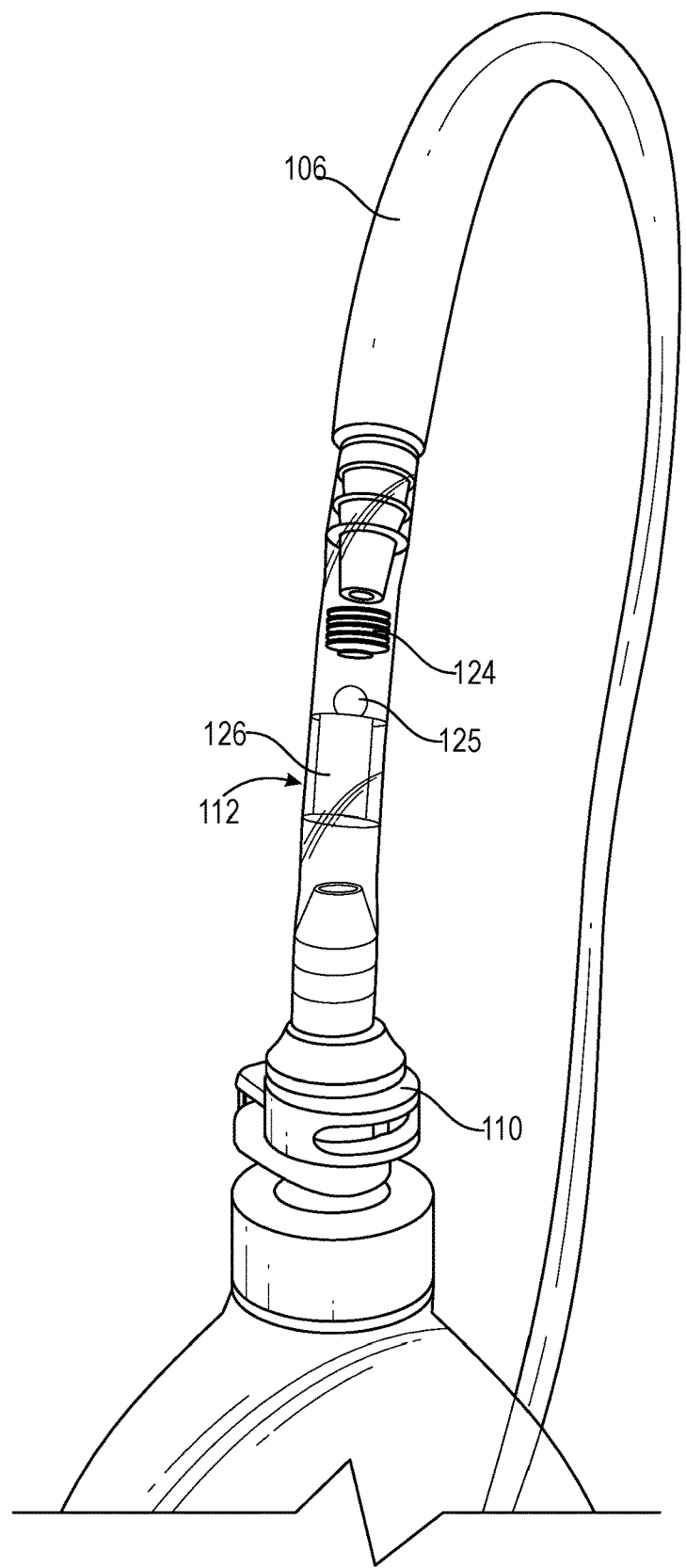
FIG. 7 illustrates a side perspective, detailed view of a flow-restricting device, in a closed position, and a liquid reservoir of a hydration system.

Referring to FIGS. 5-7, the flow-restricting device 112 (e.g., check valve) may comprise a flow through material 124 (e.g., mesh or a metal coil), a sphere 125, and a cylindrical component 126 that has two apertures for allowing liquid to pass therethrough. The sphere 125 is positioned in between the flow through material 124, which is in closer proximity to the hydration valve 108, and cylindrical component 126, which is in closer proximity to the liquid reservoir 102, all of which are found within the tube 106 so as to prevent backflow. For example, as best shown in FIG. 4, when the user applies suction on the hydration valve 108 and tube 106, the sphere 125 will move from a resting, closed position (backflow blocked) on an aperture of the cylindrical component 126 to the flow through material 124. This allows the liquid to flow freely through the cylindrical component 126, pass around the sphere 125 (which is narrower in diameter than the internal diameter of the tube 106, thereby allowing flow), and through the flow through material 124 to the user via the hydration valve 108. When a user stops suction, the pressure within the bottle pulls the sphere 125 back to seat in the opening of the cylinder 126, as shown in FIGS. 6 & 7, thereby preventing backflow to the reservoir 102. In some embodiments, the check valve 112 may comprise other components known in the art, such as a housing, spring, and ball assembly. Other types of flow-restricting devices that may be used include, but are not limited to, top-hinged, tilting disc, or butterfly check valves. It will be understood that any one-way valve configuration may be used without departing herefrom. It will also be appreciated that the check valve 112 may be located near the reservoir 102, near the bite valve 108, or at any position along the tube 106. In some embodiments, it may be ideal for the check valve 112 to be proximal to the bite valve 108 so as to prohibit backflow from entering the tube 106.

Figure 8:
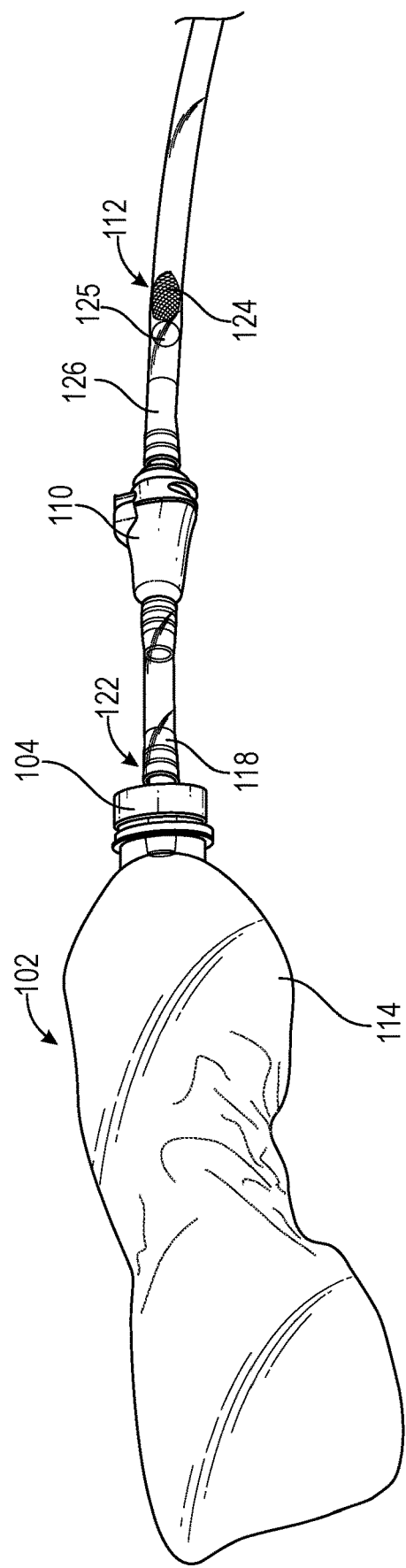
FIG. 8 illustrates a side perspective view of a hydration system with vacuum pressure generated by a user on the liquid reservoir (e.g., plastic bottle)
Figure 9:
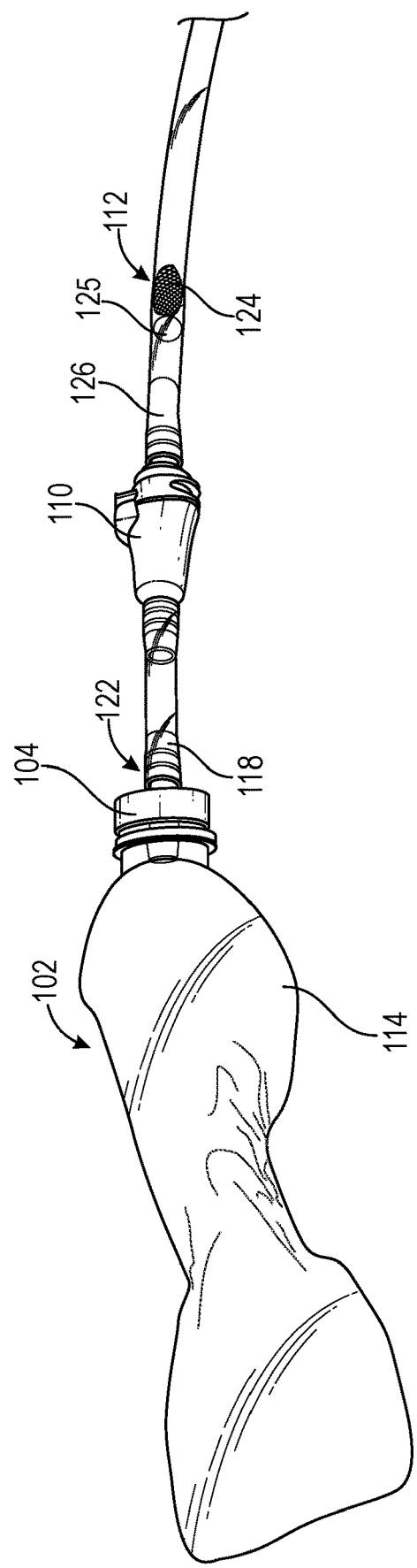
FIG. 9 illustrates a side perspective view of a hydration system with vacuum pressure generated by a user on the liquid reservoir (e.g., plastic bottle)
Figure 10:
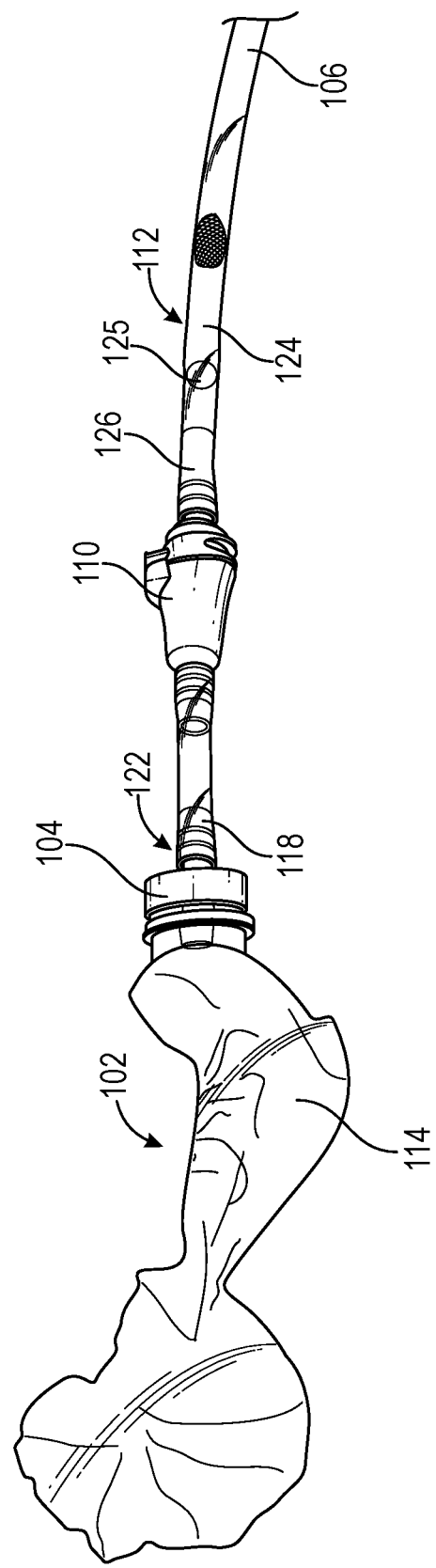
FIG. 10 illustrates a side perspective view of a hydration system with vacuum pressure generated by a user on the liquid reservoir (e.g., plastic bottle)

As shown in FIGS. 8-10, when the liquid passes to the user, the liquid reservoir 102 (e.g., disposable water bottle 114) compresses due to the vacuum pressure that the user creates during the suction process. Vacuum pressure is illustrated as progressing from FIG. 8 through 10, where the water bottle 114 is shown collapsed. It will be appreciated that the liquid reservoir 102, in a crushed or compressed form, helps conserve space in a backpack while hiking or when it is being discarded in the trash or recycle bin. Once suction has ceased, as best shown in FIG. 5, vacuum pressure pulls the sphere 125 back to rest on the aperture of the cylindrical component 126 preventing any liquid from flowing back to the liquid reservoir 102 (i.e., the sphere 125 completely blocks the aperture in the cylindrical component 126). Utilizing a flow-restricting device 112 allows the liquid reservoir 102 to maintain a clean environment, avoiding backflow or other substances from entering through the tube 106 into the reservoir 102. The flow-restricting device 112 can be located anywhere in the hydration apparatus, including, but not limited to, being interposed between the first end 120 and second end 122, in or around the hydration valve 108, in or around the reservoir coupler 104, or within a liquid reservoir 102 (for example, within the entry to a bladder system).

Figure 11:
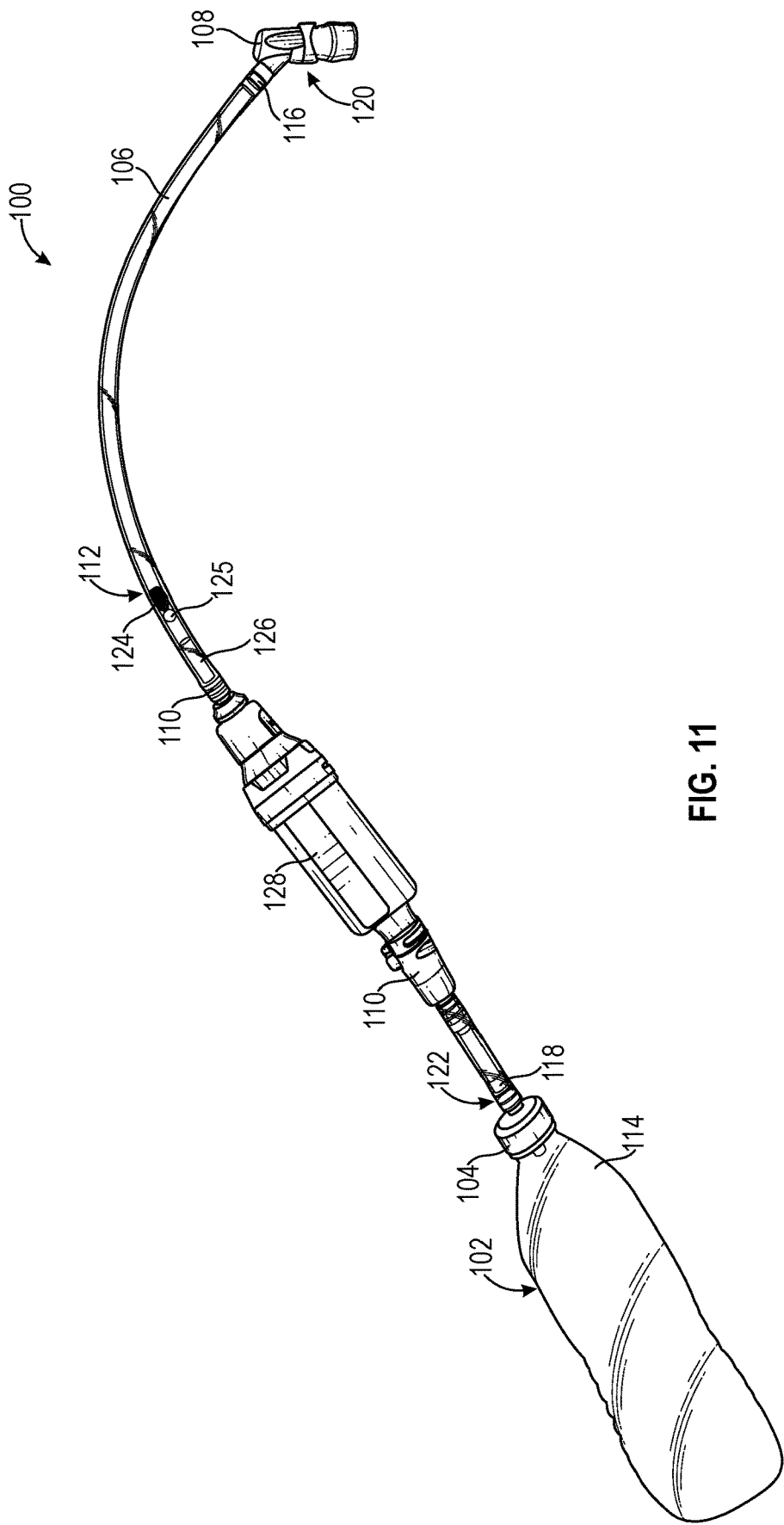
FIG. 11 illustrates a side perspective view of a water filter coupled to a hydration system.
Figure 12:
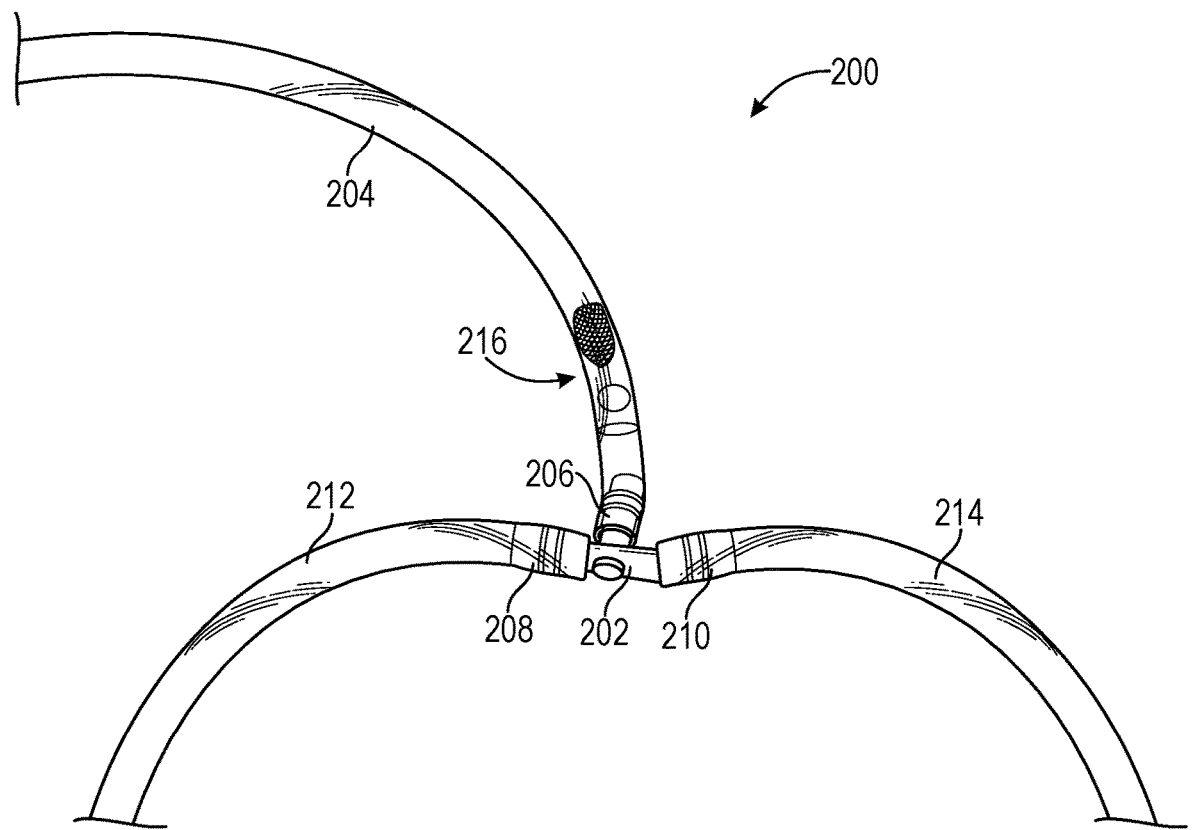
FIG. 12 illustrates a side perspective view of T-coupler of a hydration system.

In some embodiments, shown in FIG. 11, a hydration apparatus 100 further comprises a water filter 128. The water filter 128 can be coupled anywhere, interposed between a tube coupler 110, in, or along, a tube 106. The water filter 128 can prevent any debris or bacteria from reaching the user's mouth.

In some embodiments, a hydration delivery tube 106 comprises a first end 120 having a hydration valve 108, a second end 122 for coupling to a liquid reservoir 102, and a flow-restricting device 112 (e.g., check valve) within the tube 106 interposed between the first 120 and second ends 122.

Figure 13:
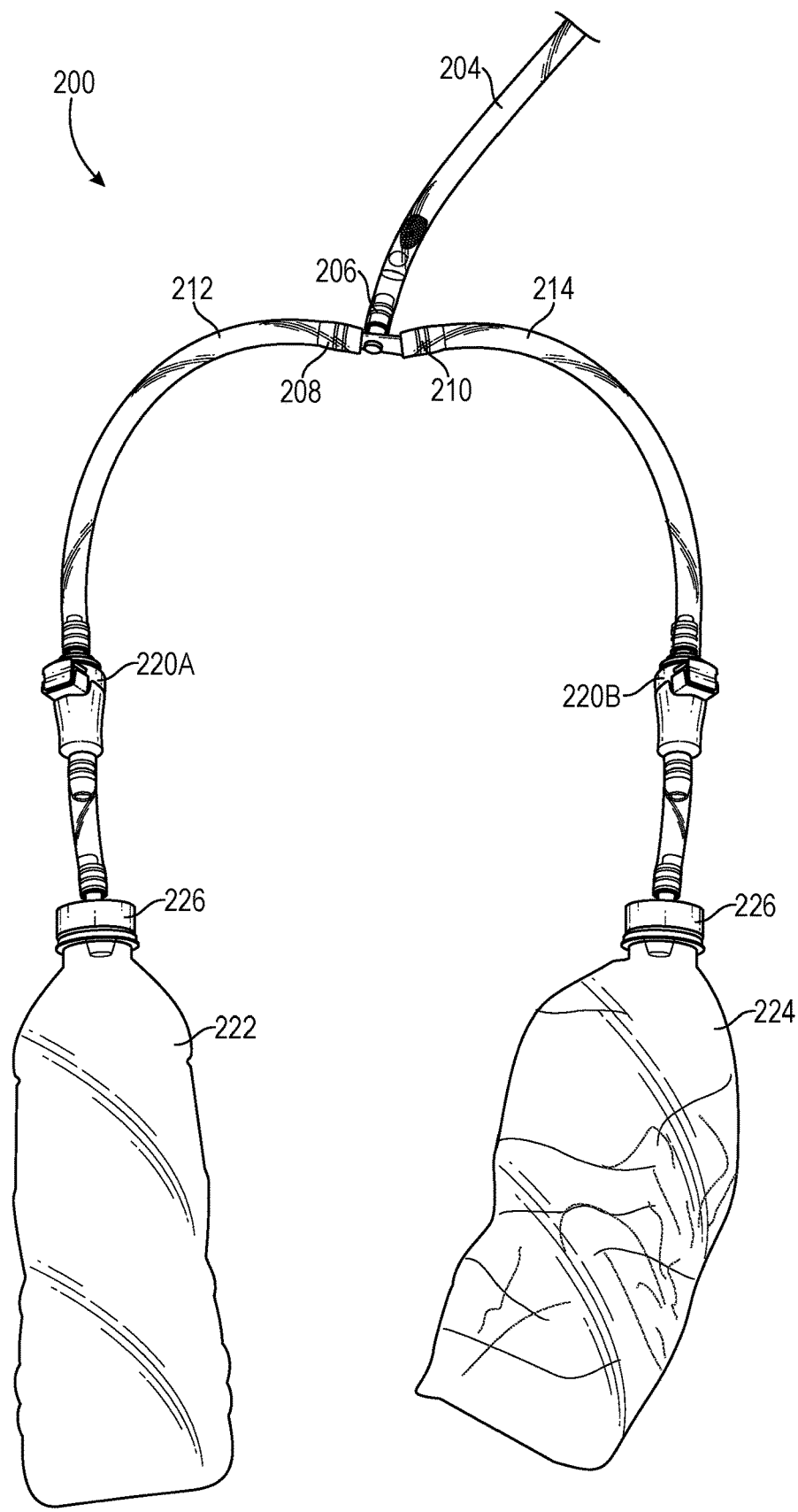
FIG. 13 illustrates a side perspective view of T-coupler and a first and second liquid reservoir of a hydration system.
Figure 14:
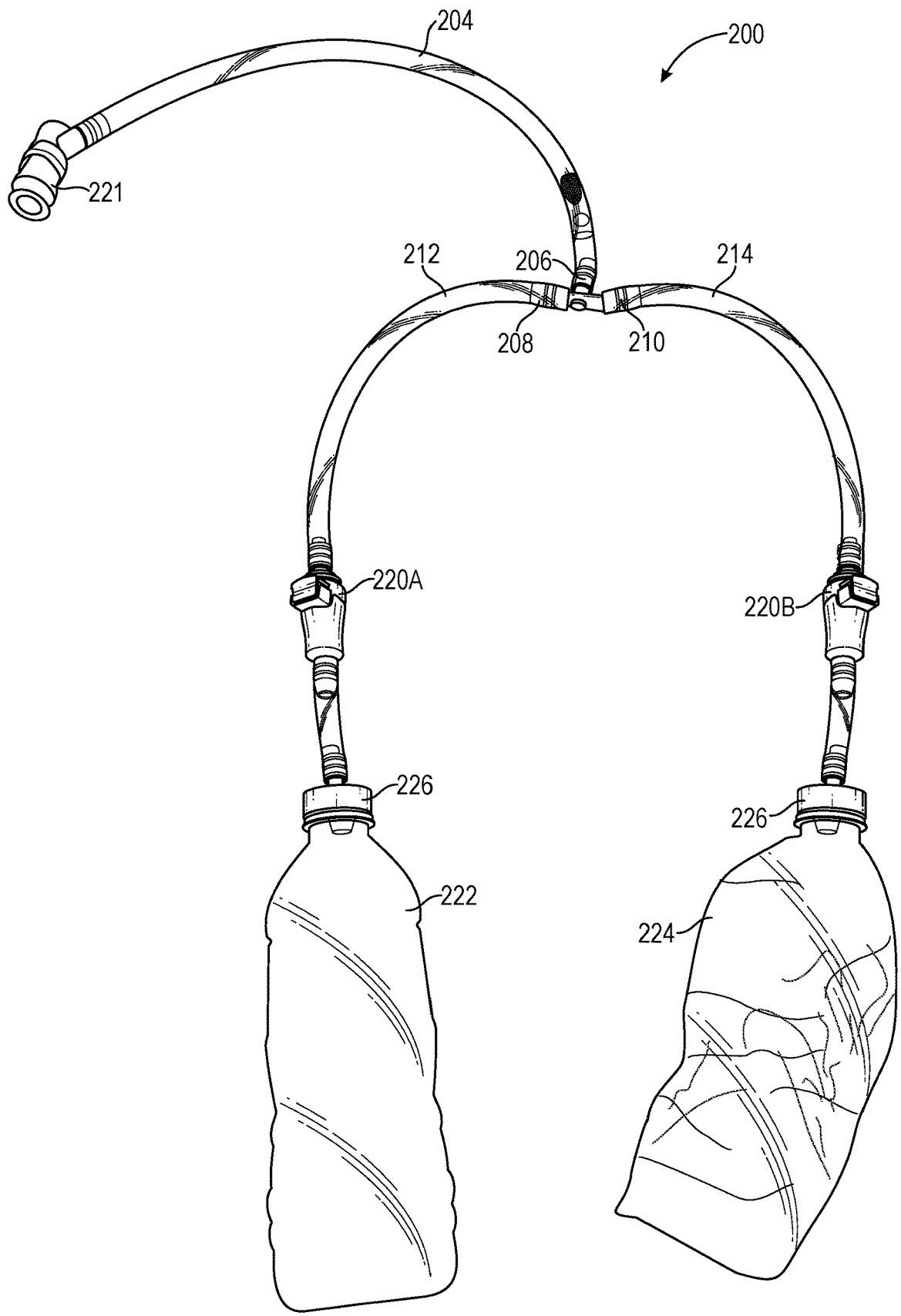
FIG. 14 illustrates a side perspective view of T-coupler, a hydration valve, and a first and second liquid reservoir of a hydration system.
Figure 15:
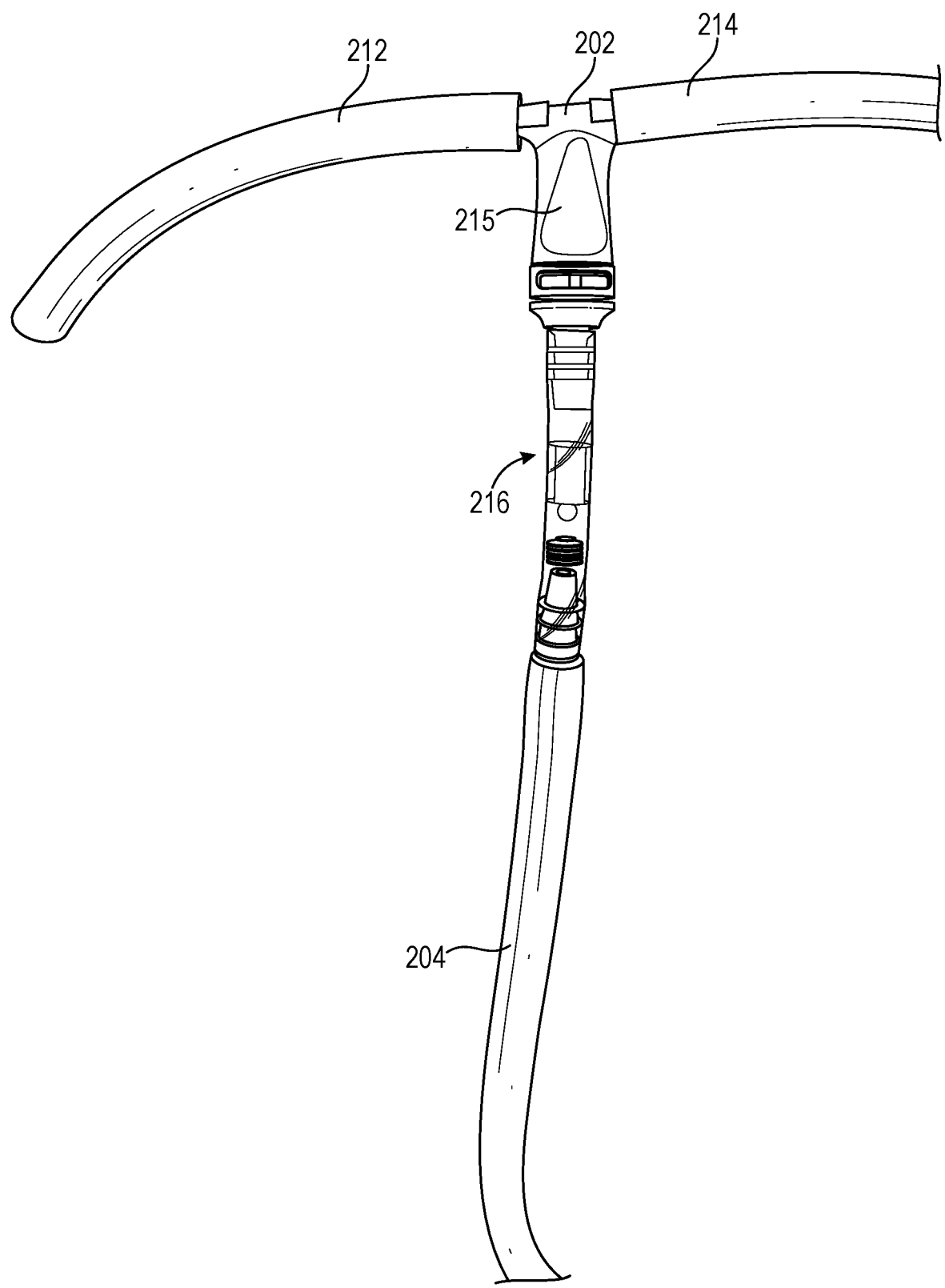
FIG. 15 illustrates a detailed, side perspective view of T-coupler, a tube coupler, and a flow-restricting device of a hydration system.

Referring to FIGS. 12-15, in some embodiments, a hydration system 200 comprises a T-coupler 202 that can be coupled along a primary tube 204. The T-coupler 202 has three coupling sites: a first 206, a second 208, and a third 210 where three separate tubes may connect. The first coupling site 206 couples to the primary tube 204, while the second coupling site 208 couples to a secondary tube 212, and the third coupling site 210 couples to a tertiary tube 214. In some embodiments, shown in FIG. 15, the T-coupler may comprise a tube coupler (e.g., quick connect) 215 so as to connect one or more liquid reservoirs. A flow-restricting device 216 (e.g., check valve) may be found anywhere along the primary tube 204; however, the flow-restricting device 216 is not limited to the primary tube 204. For example, the flow-restricting device 216, as described in detail above, may be found in both the primary, secondary, and/or tertiary tubes, 204, 212, 214, or anywhere in the hydration system 200. Referring to FIG. 13, a tube coupler 220A, 220B may be positioned on any of the tubes, 204, 212, 214, so that the hydration system 200 may be quickly assembled or disassembled. A hydration valve 221 (FIG. 14) allows a user to obtain liquid from a first liquid reservoir 222 and a second liquid reservoir 224 simultaneously, while preventing backflow to each.

While a user may obtain liquid from the first and second liquid reservoirs 222, 224, simultaneously, an alternate embodiment comprises a stop switch in each of the secondary and tertiary tubes, 212, 214, that allows a user to obtain water from one liquid reservoir or both. For example, a user may have the first liquid reservoir 222 filled with water and the second liquid reservoir 224 filled with a sports drink. The user may drink the water while participating in an activity, but when the user needs the added benefits of the sports drink, the user may stop the flow of the water by engaging the stop switch on the secondary tube 212 and allows the flow of the sports drink by disengaging the stop switch on the tertiary tube 214. In addition, the hydration system 200 couples to the first and second liquid reservoirs 222, 224 by reservoir couplers 226. Due to the check-valve 216, the contents of the reservoirs 222, 224 are not mixed. In other words, the sports drink (e.g., Gatorade®) does not flow into the water when a user switches between reservoirs.

Figure 16:
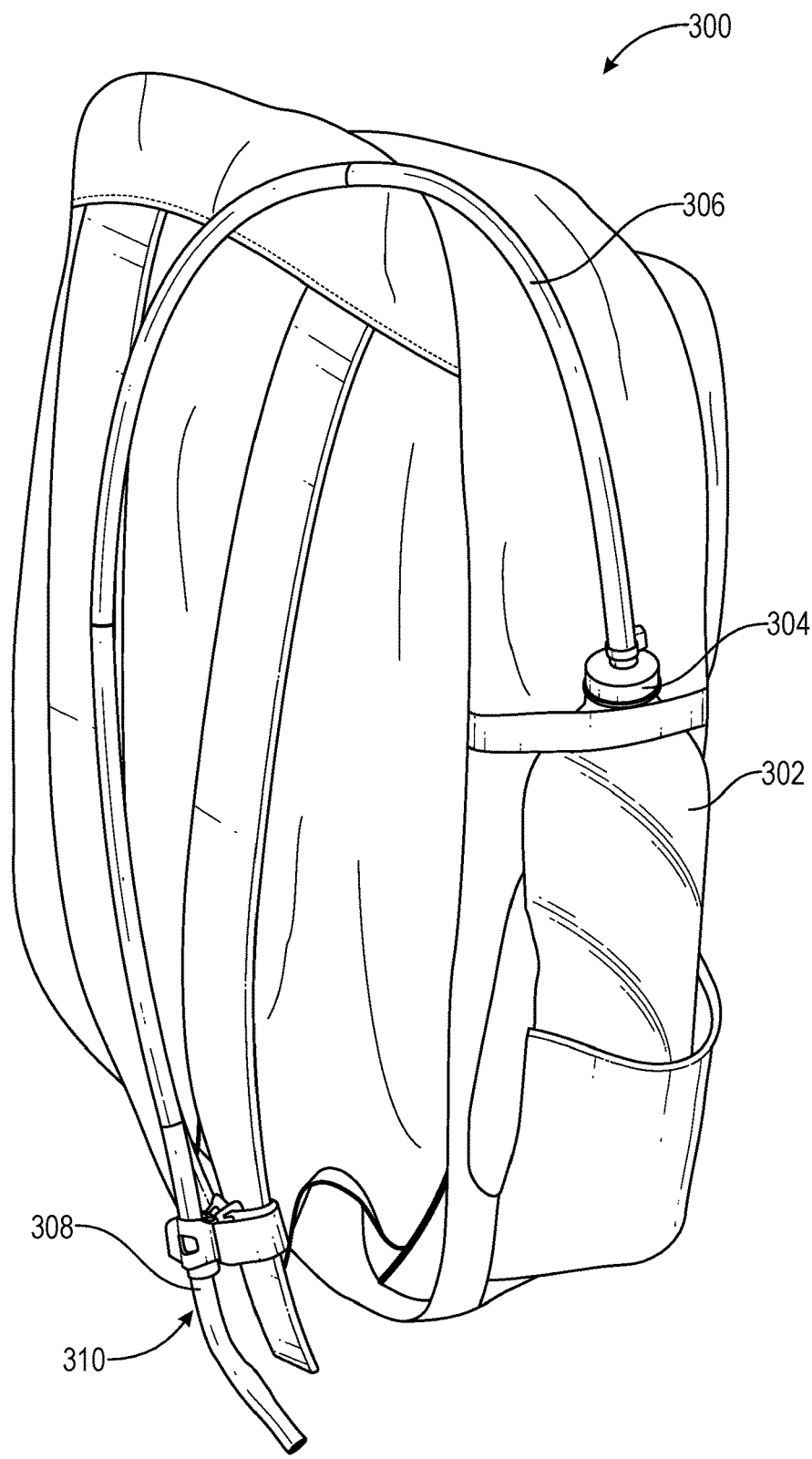
FIG. 16 illustrates a rear, side perspective view of a hydration system coupled to a backpack.
Figure 17:
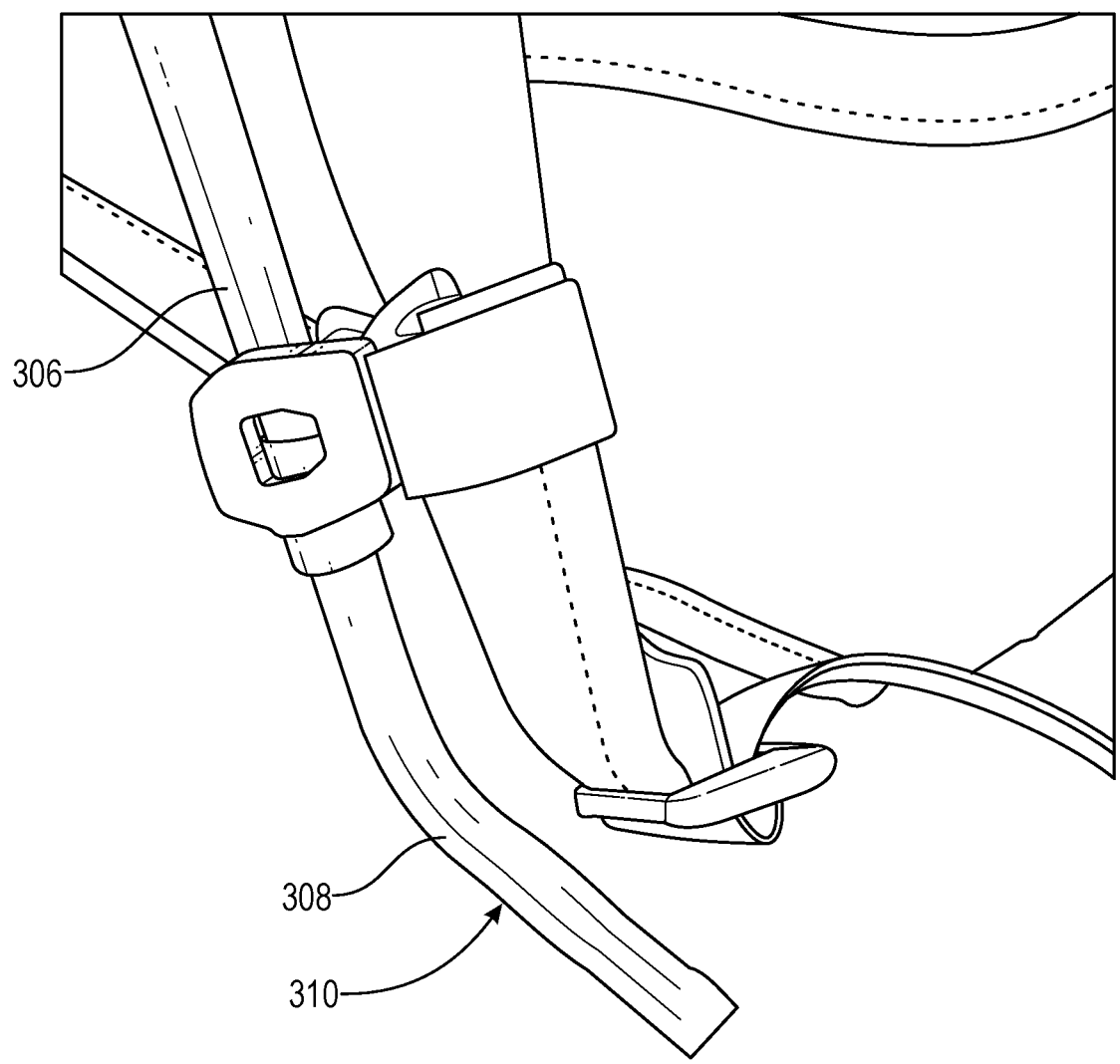
FIG. 17 illustrates a detailed, perspective view of a tube of a hydration system coupled to a backpack.
Figure 18:
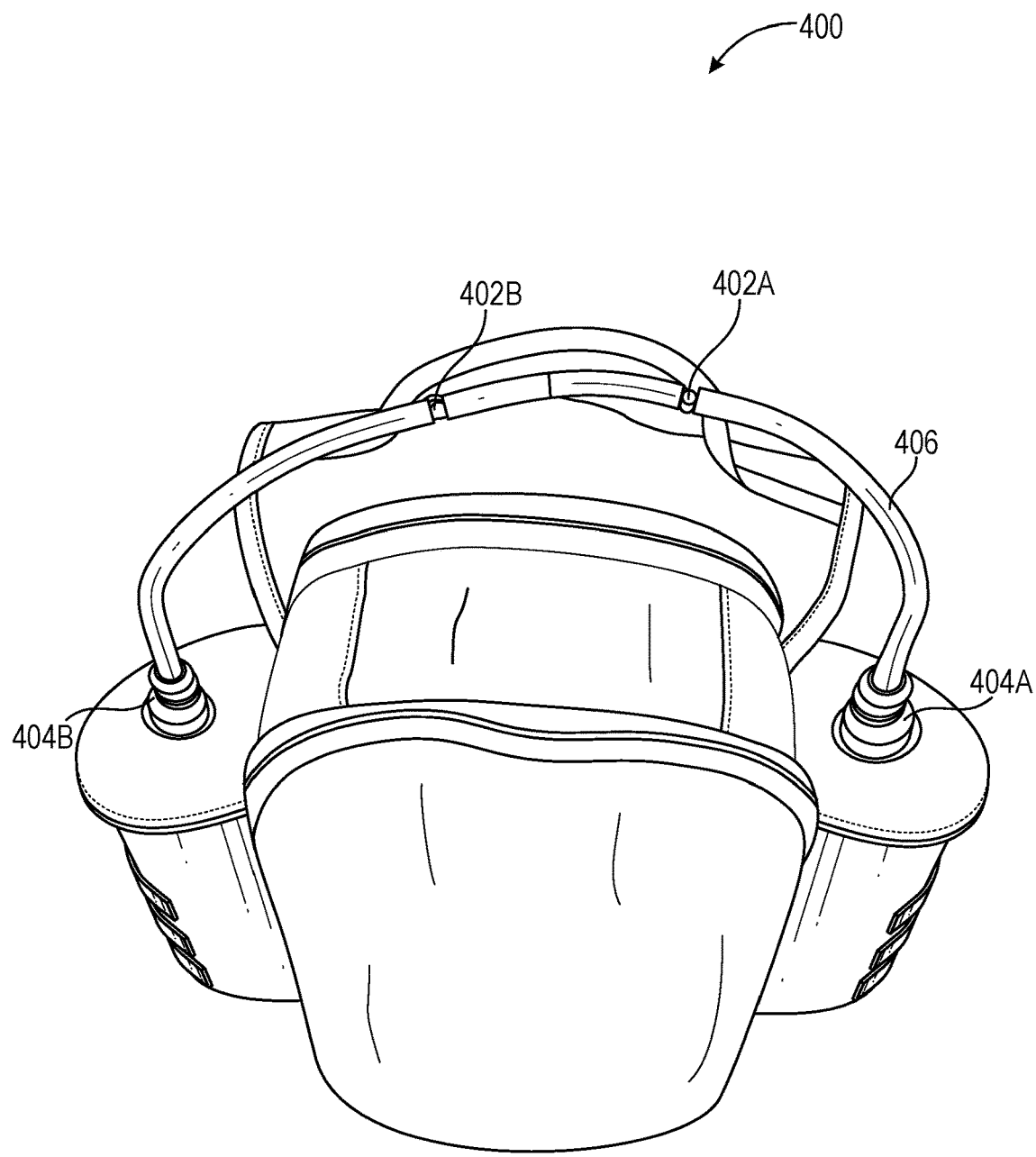
FIG. 18 illustrates a top perspective view of a hydration system with a plurality of tubes coupled to a backpack.
Figure 19:
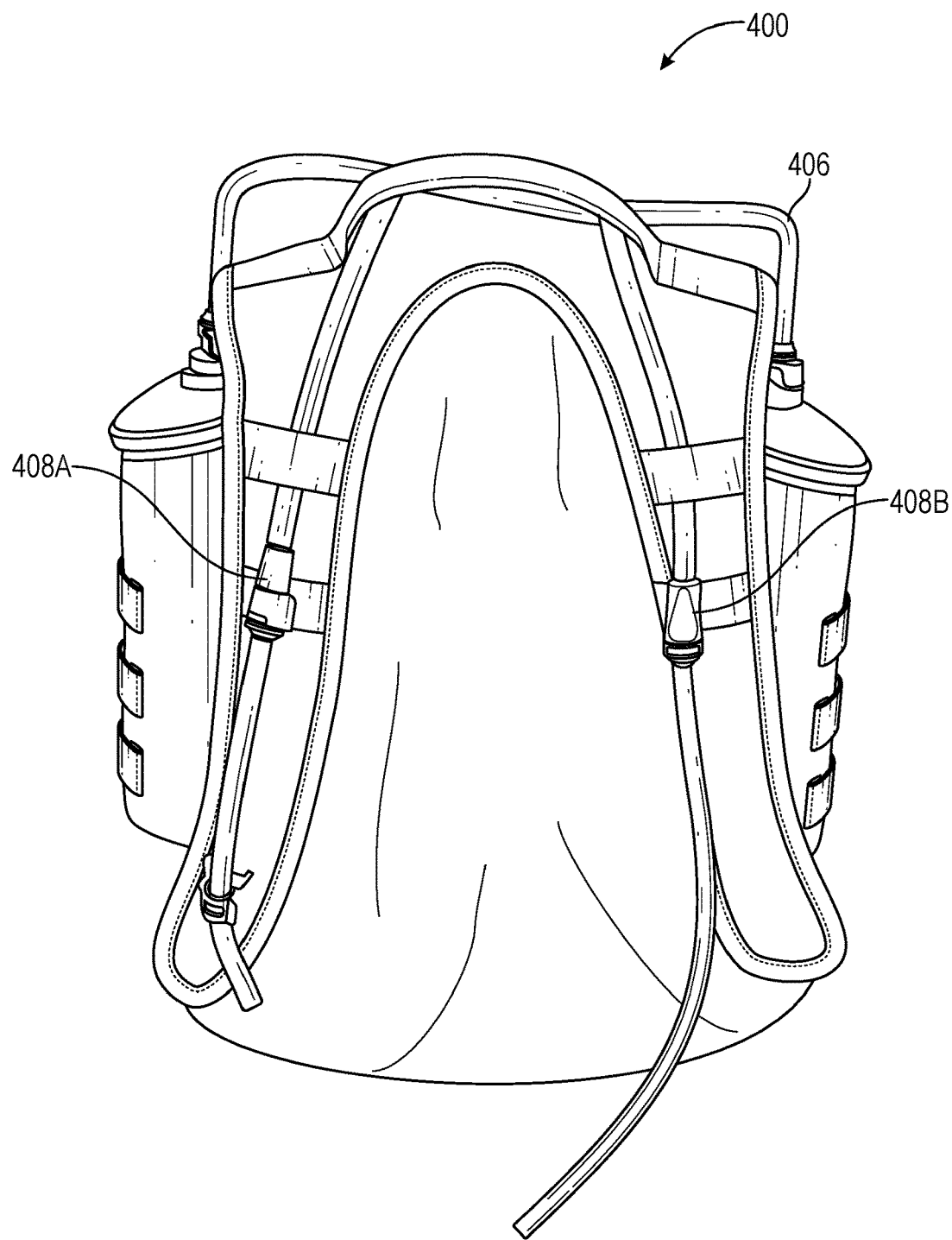
FIG. 19 illustrates a rear perspective view of a hydration system with a plurality of tubes coupled to a backpack.
Figure 20:
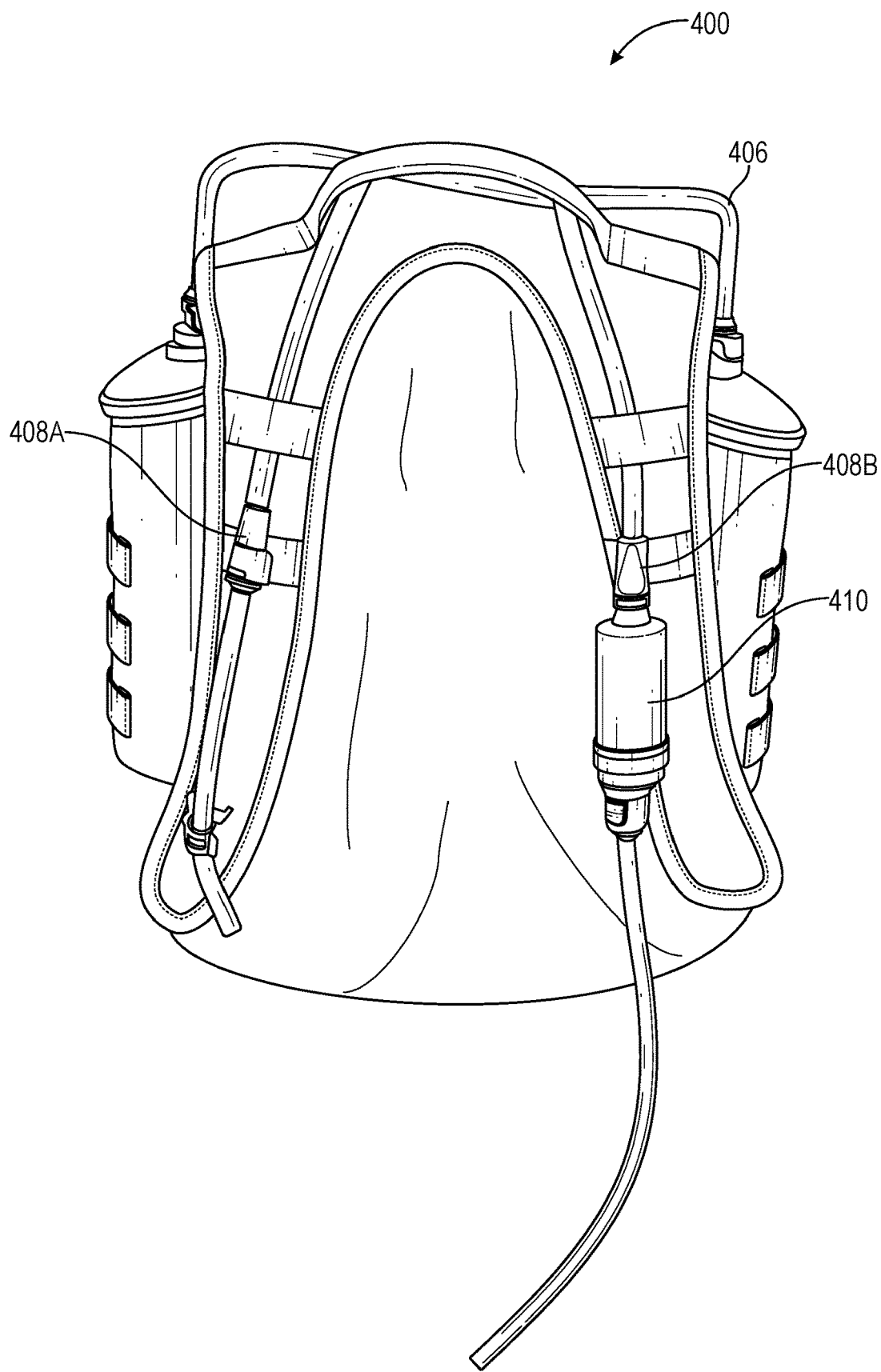
FIG. 20 illustrates a rear perspective view of a hydration system with a plurality of tubes and water filter coupled to a backpack.
Figure 21:
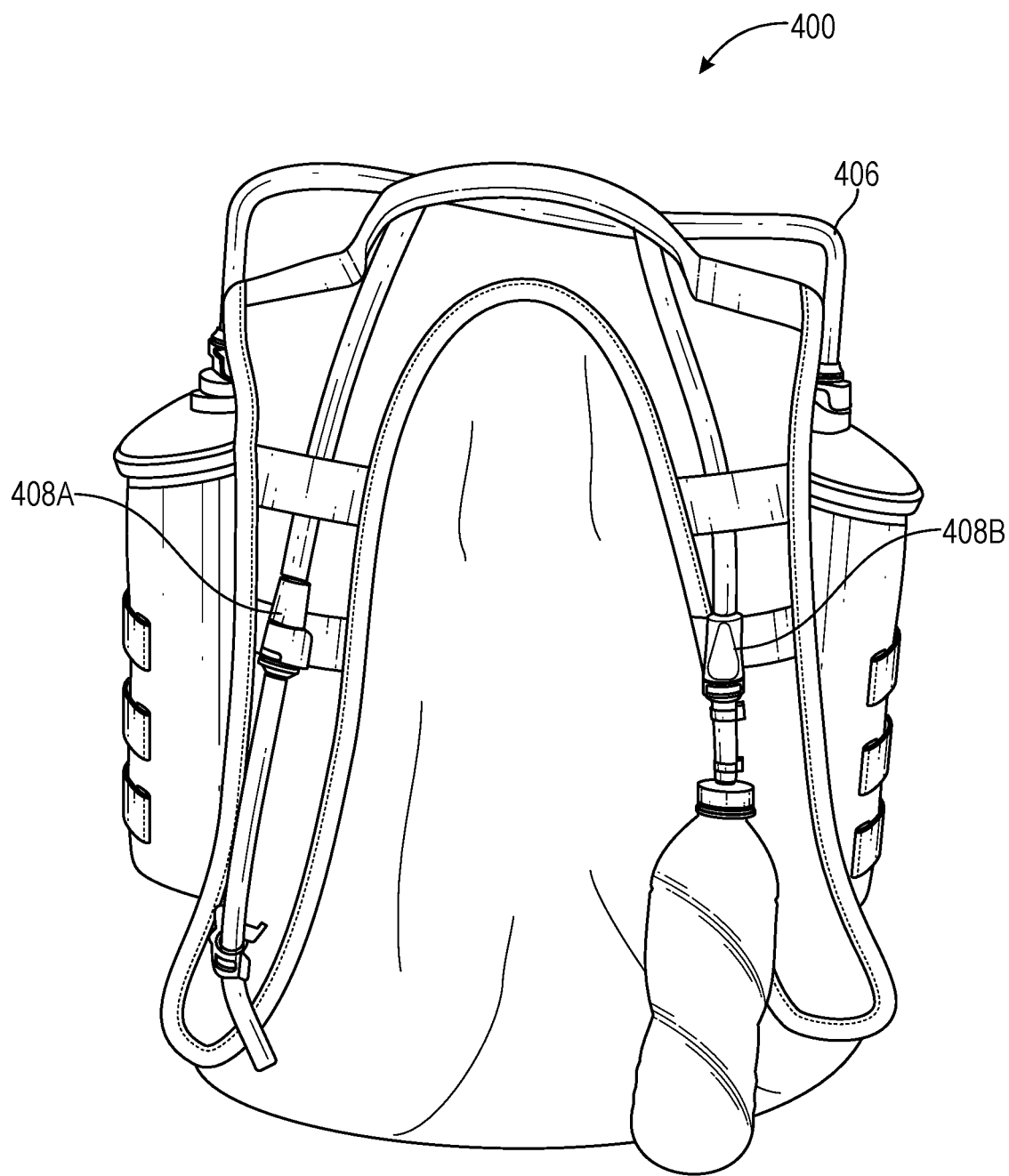
FIG. 21. illustrates a rear perspective view of a hydration system with a plurality of tubes coupled to a backpack.
Figure 22:
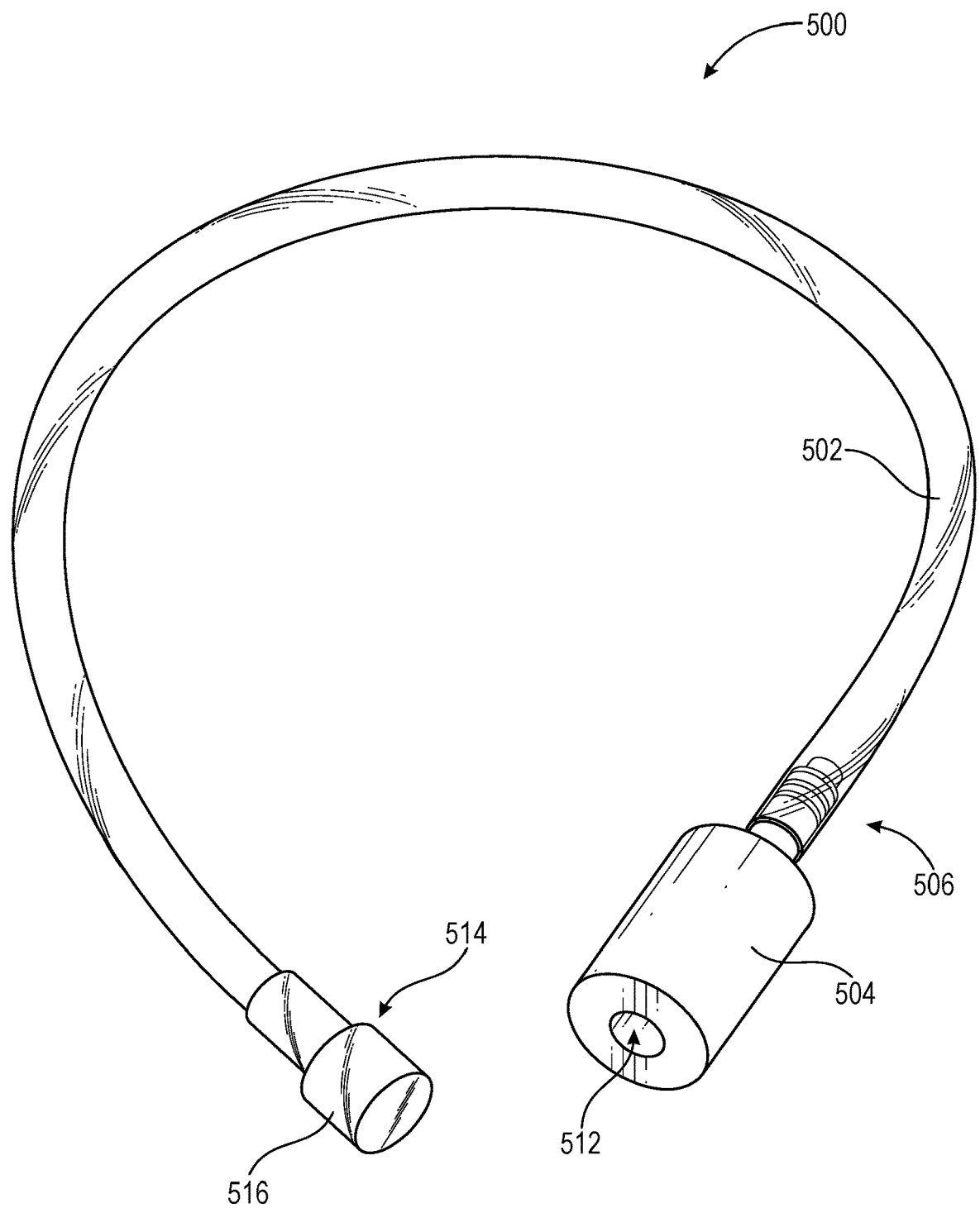
FIG. 22 illustrates a perspective view of a hydration system comprising a plug.

In some embodiments, as shown in FIGS. 16-17, a hydration system 300 comprises a liquid reservoir 302, a reservoir coupler 304, a tube 306, and a flow-restricting device 308 (e.g., check valve). The tube 306 may be continuous, without any quick couplers or breaks therein. Additionally, a user retrieves liquid from the liquid reservoir 302 by applying suction on the tube 306, without the aid of any type of a bite valve. The flow-restricting device 308 is positioned within the tube 306 at the angled portion 310 so that when the user draws liquid from the liquid reservoir 302 water is allowed to flow to the user. When suction has ceased, water is prevented from returning to the reservoir 302 via the check valve 308 and is prevented from exiting the tube 306 because of the vacuum pressure on the check valve 308.

Referring to FIGS. 18-21, in some embodiments, a hydration system 400 comprises T-couplers 402A, 402B, liquid reservoirs 404A, 404B, a plurality of tubes 406, and tube couplers (e.g., quick connects) 408A, 408B. With numerous T-couplers 402A, 402B, a user may retrieve water/liquid from more than a single tube. This is beneficial for several reasons; for example, it allows a user to distribute weight of the water/liquid on the pack. Further, it will be appreciated that multiple users may drink from the same liquid reservoirs without contaminating them. For example, a user may couple their own tube, with a tube coupler, to a hydration system 400 to retrieve liquid. When the user is finished, they may quickly detach their tube. It will further be appreciated that the tube couplers 408A, 408B allow water filters 410, liquid reservoirs 404A, 404B, or any tube to be connected thereto.

While two T-couplers 408A, 408B are shown, in some embodiments, there may be two or more T-couplers 408A, 408B so as to accommodate numerous users. For example, the liquid reservoir may be a large drum (e.g., Igloo® water jug), with numerous tube couplers to accommodate, for example, a sports team or scouts with each having their own quick connect tube. This eliminates the need for cups and allows users to use their own tube 106, 206, 306, 406 with a check valve, keeping the reservoir sanitary while also reducing waste, both of which are improvements over the prior art. Indeed, any of the embodiments discussed herein allow a user to connect their tube 106, 206, 306, 406, to any number of reservoirs, including those of others, without fear of contamination. This allows users to share drinks in any scenario, whether hiking, playing sports, during an emergency, or other scenario, without cross-contaminating the source (e.g., water). This is a significant improvement over the current art, which does not prevent backflow. Additionally, users may opt to use disposable water bottles so as to avoid carrying empty, reusable bladders for significant distances.

Figure 23:
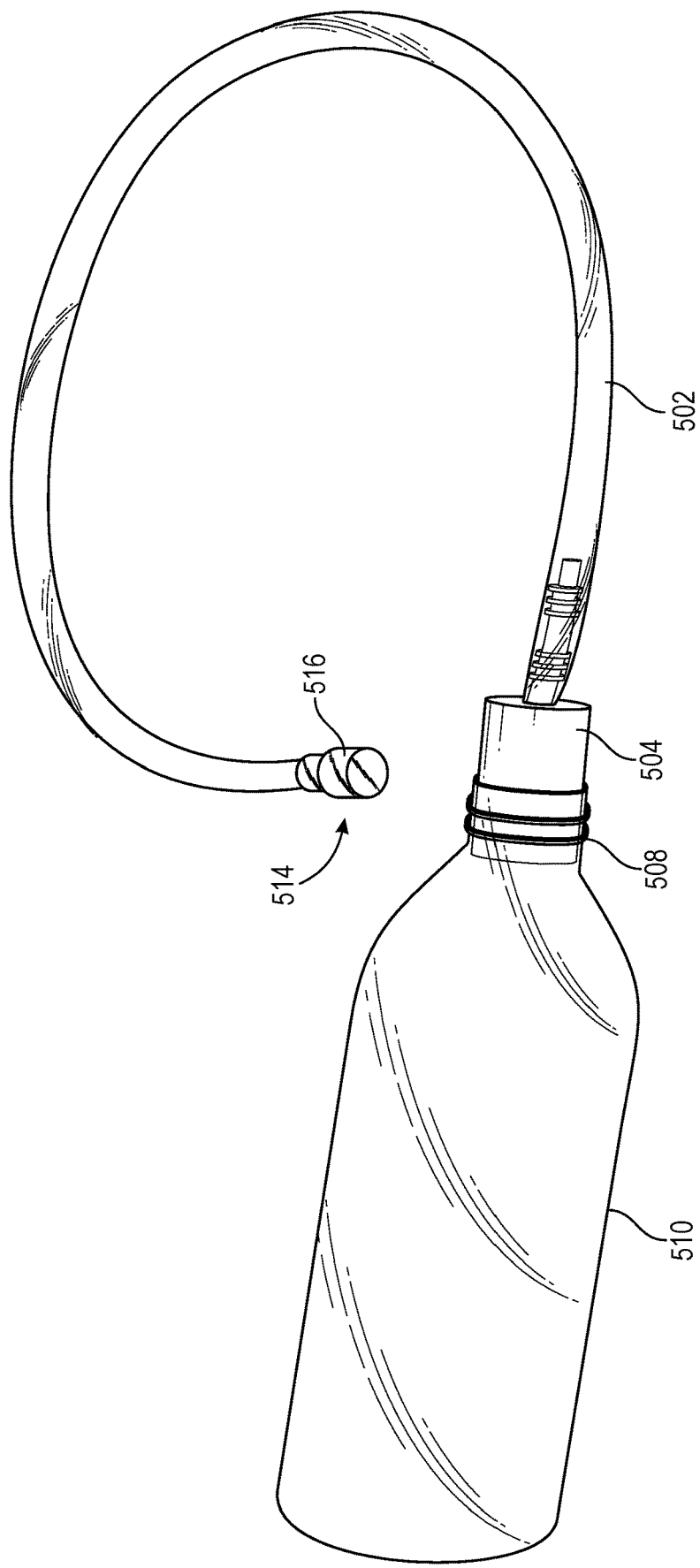
FIG. 23 illustrates a perspective view of a hydration system comprising a plug coupled to a liquid reservoir.

In some embodiments, as shown in FIGS. 22-25, a hydration system 500 comprises a tube 502 having a plug 504 at a first end 506. As best seen in FIG. 23, the plug 504 is configured to be received within the neck 508 of a bottle 510 (an example of a "liquid reservoir"). The plug 504 thereby seals the neck 508 of the bottle, allowing vacuum pressure (suction) to be applied by a user to remove liquid from the bottle 510. The tube 502 or plug 504 further comprises a flow-restricting device (e.g., check valve) therein. Although not visible in these views, the flow-restricting devices shown and described elsewhere herein may be used. For example, the plug 504 comprises a channel 512 therethrough where liquid may pass from a bottle 510 to the tube 502 and to a user. The channel 512 may contain a check-valve, thereby preventing backflow from the tube 502 to the bottle 510. In some embodiments, the tube 502 may comprise a check-valve therein at any position between the plug 504 and the second end 514 where a user applies suction.

While not required, some embodiments further comprise a bite valve 516. The bite valve 516 further aids to prevent backflow from a user's mouth and into the tube 502. In some embodiments, a check valve may be situated proximal to the bite valve 516 to prevent all backflow through the tube 502. In some embodiments, only a bite valve is used and not a check valve.

Figure 24:
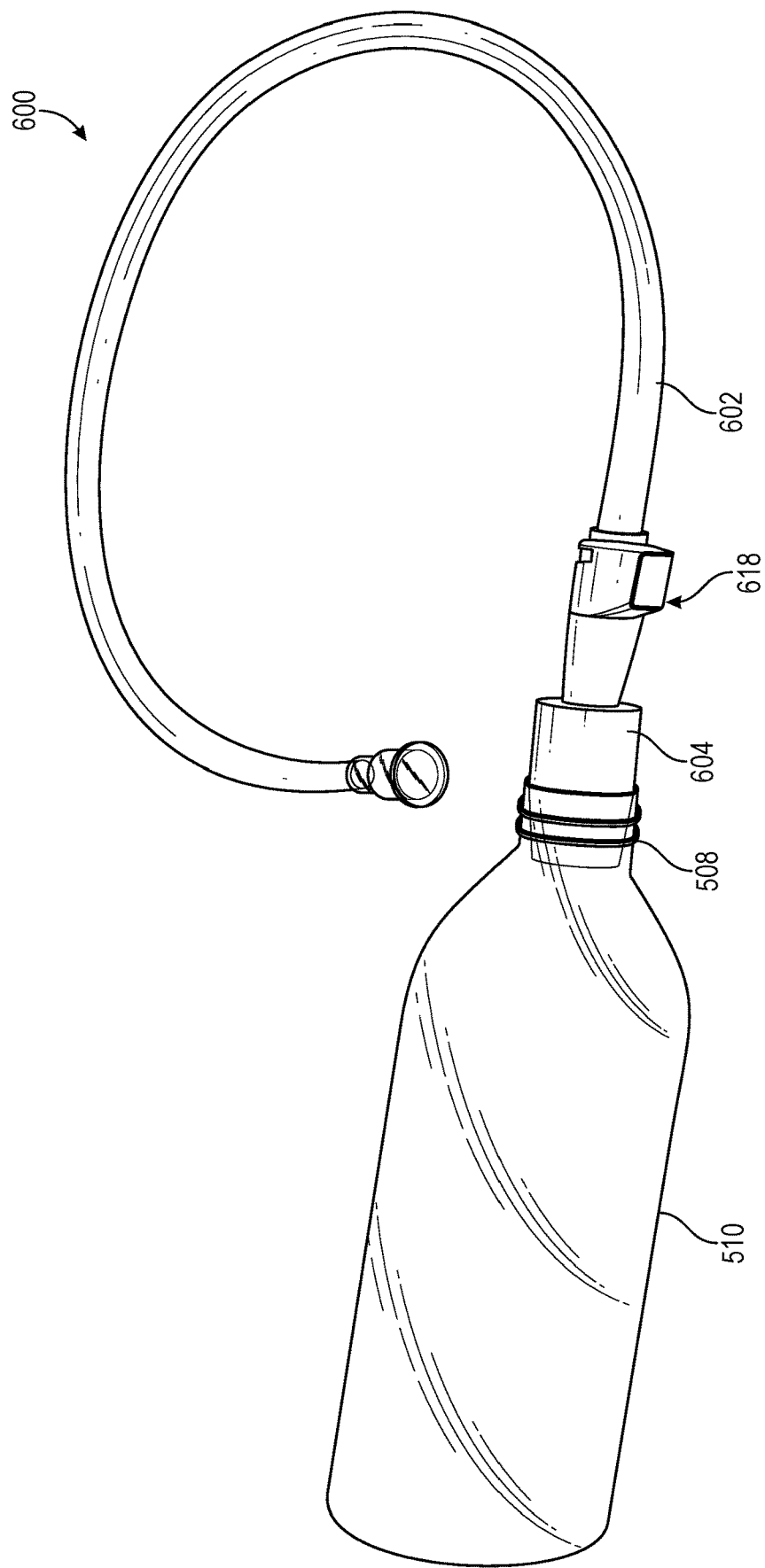
FIG. 24 illustrates a perspective view of a hydration system comprising a plug coupled to a liquid reservoir.
Figure 25:
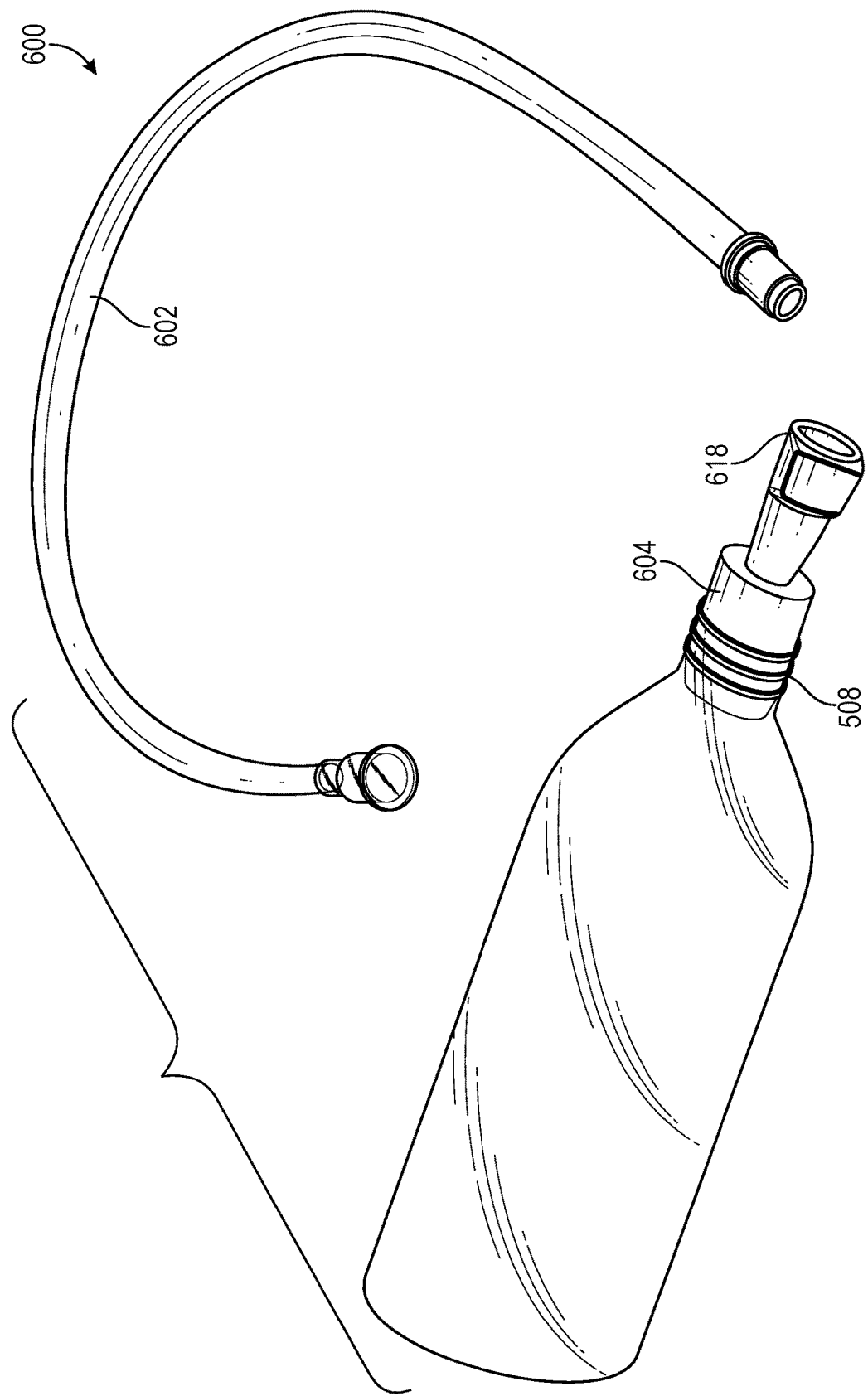
FIG. 25 illustrates a perspective view of a hydration system comprising a plug having a quick-connect coupler.

It will be appreciated that the plug 504 may be made from various materials, such as foams, plastics, rubbers, silicone, cork, any combination, or any other material suitable for plugging and sealing the neck 508 of a bottle. In some embodiments, as shown in FIGS. 24-25, a cork plug 604 may be tapered so as to be easily received within the neck 508. A user may apply pressure to the cork plug 604 until it sufficiently seals the neck 508 and cannot be removed without force (e.g., a pulling force by a user). Because the cork plug 604 seals the neck 508 of the bottle 510, liquid does not spill from the bottle 510 and a user is able to apply suction to the tube 602 to withdraw liquid from the bottle 510. Further, due to the flow-restricting device in the cork plug 604 or tube 602, vacuum pressure remains on the bottle 510, yet no backflow occurs. The plugs 504, 604 may be any size or shape so as to easily fit a variety of bottle necks. In some embodiments, the plug is malleable or pliable so as to be forced into smaller openings. As a result, a single plug 504, 604 may conform to bottlenecks of different diameters, allowing the user to utilize a single plug 504, 604 on more than one bottle. The plug 504, 604 is further beneficial because it does not require threads, which is required to couple to the exterior of the bottleneck. Instead, the plug 504, 506 may easily be coupled (inserted) into any number of bottles, regardless of thread patterns. This is a major improvement. Further, because no back flow reaches the plug 504, 604, users may share bottles 510 without fear of contamination. Simply pushing and pulling plugs 504, 604 into various bottles affords a quick, contamination free change between users.

In some embodiments, a hydration system 600 further comprises a quick-connect coupler 618. This allows users to switch between bottles 510 without the need to remove the plug 604. In other words, a single plug 604 may be used by several users without risk of contamination by simply decoupling the tube 602 from the coupler 618. In order to ensure no backflow, the flow-restricting device (e.g., checkvalve) is ideally positioned within the tube 602, ensuring that no backflow enters the coupler 618. Additionally, the tube 602 may further comprise a bite valve 616, further reducing the odds of backflow.

It will be appreciated that a user does not have to use a hydration bladder to stay hydrated. Any liquid reservoir, such as a disposable water bottle (e.g., 114, 510) or a washable bottle, can be used. The hydration bladder in the art can be frustrating due to the difficulty of maintaining and cleaning the hydration bladder. The hydration apparatus 100-600 allows a user to have a clean liquid reservoir every time, which can prevent bacteria growth. Bacteria also cannot enter the liquid reservoir from a user's mouth due to the fact that the flow-restricting device (e.g., check valve) prevents liquid from reentering the liquid reservoir. Further, when using the hydration apparatus 100-600, it provides an easy system to carry liquid on an adventure.

Additionally, in some embodiments, a hydration system 100-600 may comprise a liquid metering device, the metering device configured to detect and report the amount of liquid that has passed therethrough. In some embodiments, the metering device may be wireless (e.g., comprise a wireless transceiver (e.g., Bluetooth®)) to allow reporting to a user device, such as a smartphone or tablet. In some embodiments, the user device may further software that records usage, location, timing, and any other data deemed desirable. In some embodiments, the software may be internet-connected, allowing a user to receive reports from other devices. For example, a parent may be able to check on the hydration of a child by monitoring the metering device. Runners and other athletes may also be able to track their hydration and be alerted to ensure proper hydration during a sport.

In some embodiments, the metering device may be combined with a check valve. In some embodiments, a user may actuate the check valve using a phone that is wirelessly coupled to the metering device. In some embodiments, a mixing valve may be used and controlled via a user device, allowing a user to combine liquid from more than one liquid reservoir simultaneously and in differing or equal amounts.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:
1. A hydration system comprising:
a collapsible bottle;
a tube comprising
a first end and a second end, the first end comprising a cylindrical plug and the second end comprising a bite valve,
the cylindrical plug comprising pliable materials so as to be receivable within a neck of the collapsible bottle via interference fit, the cylindrical plug thereby sealing the collapsible bottle;
the cylindrical plug further comprising a channel therethrough to allow liquid to pass through the channel when under suction;
a check valve interposed between the bite valve and the collapsible bottle to prevent backflow into the collapsible bottle;
wherein the bite valve and check valve are:
i. absent actuation by a user, both in a closed position, and
ii. independently actuatable by:
a. a user biting the bite valve to thereby open the bite valve, and
b. applying suction to the tube to thereby actuate and open the check valve;
wherein when a user bites to open the bite valve and suction is applied to the tube, the check valve allows liquid to pass from the collapsible bottle to the user; and as liquid passes from the collapsible bottle, a volume of the collapsible bottle decreases from a first volume to a second volume, the second volume less than the first; and wherein when suction is stopped, the check valve closes due to vacuum pressure in the collapsible bottle which thereby prevents water from passing back through the tube into the collapsible bottle, the bite valve actuatable to prevent backflow from the user's mouth to the tube.

2. The hydration system of claim 1, further comprising a quick-connect coupler.

3. A hydration system comprising:

a collapsible bottle;

a tube comprising a first end comprising a cylindrical plug, and a second end comprising a bite valve;

the cylindrical plug comprising pliable materials so as to be receivable within a neck of the collapsible bottle via interference fit, the cylindrical plug thereby sealing the collapsible bottle;

the cylindrical plug comprising a channel therethrough to allow liquid to pass from the collapsible bottle to the tube when under suction;

a check valve interposed between the bite valve and the collapsible bottle to prevent backflow of liquid into the collapsible bottle;

wherein absent actuation by a user, the bite valve and check valve are both in a closed position; and wherein the bite valve is configured to open when actuated by a user and wherein the check valve is configured to open when suction is applied by the user;

wherein when the user bites to open the bite valve and suction is applied to the tube, the check valve opens to allow liquid to pass from the collapsible bottle to the user; and as liquid passes from the collapsible bottle, a volume of the collapsible bottle decreases from a first volume to a second volume, the second volume less than the first; and when suction ceases, the check valve closes due to vacuum pressure in the collapsible bottle which thereby prevents water from passing back through the tube into the collapsible bottle, the bite valve actuatable to prevent backflow from the user's mouth to the tube.

* * * * *